United States Patent
Giard

(10) Patent No.: US 8,091,897 B2
(45) Date of Patent: Jan. 10, 2012

(54) MECHANICAL SEAL ASSEMBLY

(75) Inventor: Bryan Giard, Raymond, NH (US)

(73) Assignee: A.W. Chesterton Company, Woburn, MA (US)

(*) Notice: Subject to any disclaimer, the term of this patent is extended or adjusted under 35 U.S.C. 154(b) by 0 days.

(21) Appl. No.: 11/436,716

(22) Filed: May 17, 2006

(65) Prior Publication Data
US 2007/0267818 A1 Nov. 22, 2007

(51) Int. Cl.
F16J 15/34 (2006.01)
(52) U.S. Cl. .......................................... 277/370; 277/416
(58) Field of Classification Search .......... 277/370–371, 277/416, 631, 547, 497
See application file for complete search history.

(56) References Cited

U.S. PATENT DOCUMENTS

| | | | |
|---|---|---|---|
| 1,544,609 A | | 7/1925 | Somes |
| 2,258,190 A | * | 10/1941 | Neilon ........................... 277/329 |
| 3,124,502 A | * | 3/1964 | Radke ........................... 428/66.4 |
| 4,666,001 A | | 5/1987 | Burr |
| 4,669,739 A | | 6/1987 | Riccitelli |
| 4,682,913 A | | 7/1987 | Shatto et al. |
| 4,836,694 A | | 6/1989 | Schmehr et al. |
| 5,192,083 A | * | 3/1993 | Jones et al. ................... 277/411 |
| 5,199,720 A | | 4/1993 | Radosav et al. |
| 5,571,268 A | | 11/1996 | Azibert |
| 5,711,532 A | * | 1/1998 | Clark et al. ................... 277/320 |
| 5,820,129 A | | 10/1998 | Reagan |
| 5,961,122 A | | 10/1999 | Marsi |
| 6,059,293 A | | 5/2000 | Azebert et al. |
| 6,177,644 B1 | * | 1/2001 | Wilkie et al. .............. 219/69.17 |
| 6,350,060 B1 | | 2/2002 | Peterson |
| 2002/0101038 A1 | | 8/2002 | Budrow et al. |
| 2005/0087931 A1 | * | 4/2005 | Yamauchi et al. ............ 277/358 |

OTHER PUBLICATIONS

U.S. Appl. No. 11/436,719, filed May 17, 2006.
International Search Report for Application No. PCT/US07/07475, dated May 23, 2008.
International Search Report for Application No. PCT/US07/07474, dated Aug. 26, 2008.

* cited by examiner

Primary Examiner — Vishal Patel
(74) Attorney, Agent, or Firm — Nelson Mullins Riley & Scarborough LLP; Anthony A. Laurentano

(57) ABSTRACT

A split mechanical composite seal assembly for providing a seal between a rotating shaft and a static surface. The split mechanical composite seal assembly includes first and second axially adjacent annular seal elements. The first and second seal elements each include a sealing edge contacting the shaft to provide a respective seal between the first and second seal element and the shaft. A static housing receives the first and second seal elements and engages the static surface to provide a static stationary seal, while concomitantly providing a flex region that engages the seal elements to form a dynamic seal therewith. A holder assembly receives one seal element and may include a double-angled lead-in to facilitate installation of the seal element. The holder assembly may include a detent groove for receiving and retaining an O-ring disposed about the seal element. The static housing may comprise two mating segments having overlapping surfaces.

8 Claims, 15 Drawing Sheets

MECHANICAL SEAL ASSEMBLY

FIELD OF THE INVENTION

The present invention relates to a seal assembly for sealing a shaft or a rod relative to a stationary housing component. This invention relates generally to mechanical seals. More particularly, the present invention relates to universal split mechanical seals that provide strong sealing capabilities under different operating conditions.

BACKGROUND OF THE INVENTION

Conventional mechanical seal assemblies are employed in a wide variety of environments and settings, such as for example, in mechanical apparatuses, to provide a fluid-tight seal. The sealing assemblies are usually positioned about a rotating shaft or rod that is mounted in and protrudes from a stationary mechanical housing.

Split mechanical seals are employed in a wide variety of mechanical apparatuses to provide a pressure-tight and fluid-tight seal. The mechanical seal is usually positioned about a rotating shaft that is mounted in and protruding from a stationary housing. The seal is usually bolted to the housing at the shaft exit, thus preventing the loss of pressurized process fluid from the housing. Conventional split mechanical seals include face-type mechanical seals, which include a pair of sealing rings that are concentrically disposed about the shaft, and axially spaced from each other. The sealing rings each have sealing faces that are biased into sealing contact with each other. Usually, one seal ring remains stationary, while the other ring contacts the shaft and rotates therewith. The mechanical seal prevents leakage of the pressurized process fluid to the external environment by biasing the seal ring sealing faces in sealing contact with each other. The rotary seal ring is usually mounted in a holder assembly which is disposed in a chamber formed by a gland assembly. The holder assembly may have a pair of holder halves secured together by a screw. Likewise, the gland assembly may have a pair of gland halves also secured together by a screw. The sealing rings are often divided into segments, each segment having a pair of sealing faces, thereby resulting in each ring being a split ring that can be mounted about the shaft without the necessity of freeing one end of the shaft ends.

Prior split mechanical seals have rotary and stationary components assembled around the shaft and then bolted on to the equipment to be sealed. A rotary seal face is inserted into a rotary metal clamp after the segments are assembled around the shaft. Then, the stationary face segments and gland segments are assembled and the split gland assembly is then bolted to the pump housing.

Previous split mechanical seal designs posed several problems. A first problem with prior split mechanical seal designs relates to the insertion of the rotary seal ring into the holder assembly that is clamped around the shaft. An O-ring seals the rotary seal face to the clamped holder in an axial direction. The rotary seal face must be pushed into a tight space inside the clamped holder, and some difficulty may often be encountered. The elastomeric O-ring sealing the rotary seal face to the holder needs to be compressed for sealing, and a certain amount of force is required to insert the seal face inside the clamped holder. In addition, since the O-ring tends to grab the seal ring and inhibits sliding, the rotary seal face of prior art mechanical seal assembly designs has a tendency to "pop-out" after being inserted. Further, the movement of the O-ring when installed can result in the O-ring being disposed in an angled position, rather than a more preferred vertical position relative to the rotary seal ring. From the angled position, the installer would be required to move the O-ring back to the original position, which is difficult. This process can require several attempts during installation to have the rotary seal face properly seated inside the clamped holder.

Another important consideration is to maintain perpendicularity of the rotary seal face to the shaft for smooth operation. It is quite possible to have one side of the rotary seal face further inside the clamped holder than the other side. The result is an out-of-squareness condition of the rotary seal face with respect to the shaft axis. This in turn creates a back and forth motion of the stationary seal ring as it tilts from side to side in order to track the rotary seal ring with every shaft revolution. If significant enough, this can result in shortened seal life.

Another problem experienced with prior split mechanical seal designs occurs when excessive torque is applied to the gland bolts while tightening the seal gland to the pump or other equipment housing. This problem is most severe when only two gland bolts are used. Since two and four bolt configurations are the most common bolt designs, bolt slots are typically not provided in an even symmetrical location with respect to the gland splits. Indeed, when two bolts are used the most logical bolt location would be to have them located 90 degrees from the split. If this were done, however, when four bolts are used, the other two bolts would be located right at the split, which is undesirable. To avoid this design occurrence, the slots are located anywhere from about 15 to 45 degrees from the split line.

Therefore when only two bolts are used for the gland assembly, the loading on the gland halves is not symmetrical or even with respect to the split plane. The face gasket which is compressed between the gland and the housing is typically of an elastomeric material which is resilient enough to provide a seal. Given the uneven nature of the clamping load, the bolting force must be transmitted on each side of the split by the joining mechanism of the gland halves. These are typically an alignment pin and a securing screw tangential to the shaft outer diameter (compared to the axial direction of the gland bolts). The alignment pins are quite small in relation to the forces applied, and therefore cannot ensure that the gland halves will not slide against each other thereby distorting the alignment pin and the gland halves. The result is twofold: first there is a reduction in sealing ability of the gaskets between the gland halves, and second, there is an out-of-round twisting of the gland assembly which creates sealing problems with the stationary seal ring.

SUMMARY OF THE INVENTION

The present invention provides an improved mechanical seal assembly for sealing a component, such as a pump or any rotating equipment. The mechanical seal assembly may include a rotary seal ring connected to moving components of the equipment being sealed, a stationary seal ring that creates a seal against the rotary seal ring and is connected to stationary components of the equipment being sealed, and associated assembly components. The improved mechanical seal assembly may include a rotary seal ring holder clamped around the shaft for holding the rotary seal ring in a selected position and configuration. The rotary seal ring holder is configured to facilitate installation of the rotary seal ring into the rotary seal ring holder and maintain the perpendicularity of the rotary seal face to the shaft being sealed. The rotary seal ring may include a detent for capturing and aligning a sealing element, such as an O-ring, for sealing against a radially outer surface of the rotary seal ring. A double angled lead-in facilitates insertion of the rotary seal ring and O-ring into the rotary seal ring holder.

The improved mechanical seal assembly may include a gland assembly having interacting, mating halves to facilitate engagement of the gland halves and reduce or prevent sliding of the gland halves relative to each other when forces from the bolts, the equipment housing, the gasket support and/or other sources are applied to the gland assembly.

According to a first aspect of the invention, a gland assembly for a split mechanical seal assembly for providing a seal around a shaft, the shaft extending along a longitudinal axis from stationary equipment if provided. The gland assembly comprises a first arcuate gland segment having a first interfacing surface formed at a first end a second interfacing surface formed at a second end and a second arcuate gland segment having a third interfacing surface formed at a first end configured to couple to the first interfacing surface and a fourth interfacing surface at a second end configured to couple to the second interfacing surface to form an annular gland assembly. At least one pair of the coupled interfacing surfaces are non-flat and shaped complimentary to each other to transmit a bolting force to the other mating gland segment.

According to another aspect of the invention, a split mechanical seal assembly is provided, which comprises a pair of stationary gland segments defining a chamber and having an inner face, each gland segment having at least one interfacing surface configured to interface with and overlap a corresponding interfacing surface of the other gland segment, a pair of rotating holder segments disposed within said chamber and radially spaced from said gland segments, a stationary seal ring assembly disposed within said chamber and axially spaced from said holder segments, and a rotating seal ring assembly disposed within said rotating holder and axially spaced from and in intimate contact with said stationary seal ring.

According to still another aspect of the invention, a method of assembling a gland for a split mechanical seal assembly is provided. The method comprises the steps of providing a first arcuate gland segment having a first interfacing surface formed at a first end a second interfacing surface formed at a second end, wherein the first interfacing surface is non-flat, and providing a second arcuate gland segment having a third interfacing surface formed at a first end configured to couple to the first interfacing surface and a fourth interfacing surface at a second end, wherein the third interfacing surface is non-flat and shaped complimentary to the first interfacing surface. The method further comprises the step of coupling the first interfacing surface and the third interfacing surface, and the second interfacing surface to the fourth interfacing surface to form an annular gland assembly, such that a portion of the first interfacing surface overlaps a portion of the second interfacing surface to transmit a bolting force to from one segment to the other.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION OF THE PREFERRED EMBODIMENTS

Figure 1:
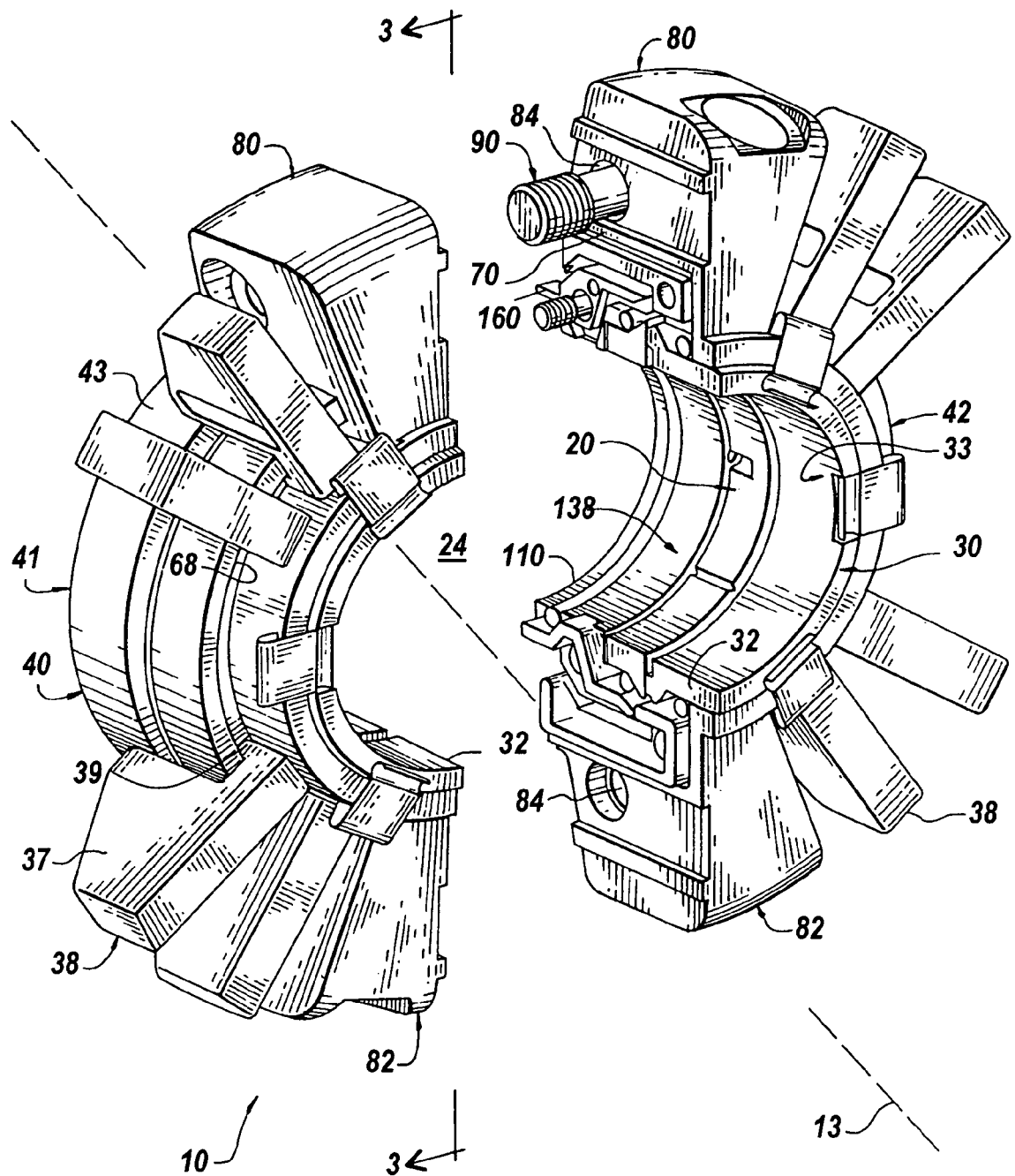
FIG. 1 is a perspective view of a split mechanical seal separated into two segments according to a preferred embodiment of the invention.

The present invention provides a mechanical seal assembly for providing sealing on a rotating shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

The terms "seal assembly" and "sealing assembly" as used herein are intended to include various types of sealing assemblies, including single seals, split seals, concentric seals, spiral seals, and other known seal and sealing assembly types and configurations.

The term "shaft" is intended to refer to any suitable device in a mechanical system to which a seal can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to the portion of stationary equipment and a seal assembly proximate the mechanical system employing the seal assembly. Conversely, the term "axially outer" as used herein refers to the portion of stationary equipment and a seal assembly distal from the mechanical system.

The term "radially inner" as used herein refers to the portion of the seal assembly proximate a shaft. Conversely, the term "radially outer" as used herein refers to the portion of the seal assembly distal from a shaft.

The terms "stationary equipment", "static surface" and "gland" as used herein are intended to include any suitable stationary structure housing a shaft or rod to which a seal is secured.

The mechanical seal assembly of an illustrative embodiment of the invention may employ an improved rotary seal ring holder for mounting and holding a rotary sealing member in a selected position within the mechanical seal assembly and/or an improved gland assembly for connecting stationary components of the mechanical seal assembly to stationary equipment.

The rotary seal ring holder in the mechanical seal ring assembly may employ a groove on a radially inner surface thereof. The groove is designed and configured to seat, catch or retain a sealing element used to seal against a radially outer surface of the rotary sealing member, such as a rotary seal ring. The groove keeps the sealing element and the associated rotary seal face in place to improve sealing and the overall life of the mechanical seal assembly. The groove also preferably captures the sealing element and the rotary seal face in a precise location so that the rotary seal face remains seated substantially perpendicular to the shaft axis.

The rotary seal ring holder has an axially-extending opening formed at an axially outer end thereof for receiving the rotary sealing member and O-ring. The axially-extending opening preferably tapers from a wide diameter at the axially outer end to a narrower opening where the rotary sealing member and O-ring are seated. The axially-extending opening in the rotary seal ring holder may taper in at least two stages. In one embodiment, described in detail below, the axially-ending receiving comprises a double-angled tapering inner surface that leads from the axially outer end of the rotary seal ring holder to the detent groove on the radially inner surface. The use of two angled faces on the radially inner surface reduces an insertion force necessary for inserting the O-ring into a space between the rotary seal ring holder and the rotary sealing member.

The seal gland assembly of the mechanical seal assembly may employ overlapping gland halves that interlock to prevent sliding of the gland halves relative to each other during operation.

FIGS. 1-5 depict a split mechanical seal 10 according to a preferred embodiment of the present invention. The mechanical seal 10 is preferably concentrically disposed about a shaft 12 that extends along a first axis 13 and is secured to an external wall of a housing 14, such as a pump or other system. The shaft 12 may be mounted, at least partly, within or adjacent to the housing. The mechanical seal 10 constructed in accordance with the teachings of this invention provides a fluid-tight seal, thereby preventing a process medium, e.g., hydraulic fluid, from escaping the housing 14. The fluid-tight seal is achieved by sealing members, illustrated as a pair of seal rings 20 and 30. The illustrative sealing members include a first or rotating seal ring 20 and a second or stationary seal ring 30 that form a seal therebetween. Each seal ring 20 and 30 has a smooth arcuate sealing surface 21, 31, respectively. The smooth arcuate sealing surface 21, 31 of each seal ring is biased into sealing contact with the corresponding sealing surface 21 or 31 of the other seal ring. Preferably, the seal rings 20 and 30 are split into segments 25, 25' and 30, 30', respectively, to facilitate installation, as described below. The sealing surfaces of the seal rings provide a fluid-tight seal operable under a wide range of operating conditions, including a vacuum condition, as described in greater detail below.

The illustrated mechanical seal 10 includes, in addition to the rotary seal ring 20 and the stationary seal ring 30, a seal gland assembly 40 for mounting stationary seal components to the equipment 14, and a seal ring holder assembly 110 for mounting the rotary seal ring 20, described in further detail below.

The holder assembly 110 defines a space 201 for receiving and retaining the rotary seal ring 20. The holder assembly 110 may be split to facilitate assembly and installation. In one embodiment, the holder assembly 110 comprises a pair of segments 112, 114 that mate to form the annular holder assembly 100. The holder assembly 110, or each holder segment if the holder assembly is split, has a radially outer surface 116 facing the gland assembly 40 and a radially inner surface 124 for sealing against the shaft and defining the space 201 for receiving and retaining the rotary seal ring 20. The holder assembly 110 forms an axially-extending annular opening at the axially outer end 111 leading to the space 201 to allow insertion of the rotary seal ring 20 into the space.

A sealing element, such as O-ring 188, is concentrically disposed about the rotary seal ring 20 to seal between the rotary seal ring 20 and the holder 110. As shown, the O-ring is preferably disposed about a radially outer surface 184 of an axially inner portion of the rotary seal ring 20, as described below, and seals against the radially inner surface 124 of the holder assembly 110. As described in detail below, the radially inner surface 124 of the holder assembly 110 may include a detent groove 189 for receiving and seating the O-ring 188 disposed about the rotary seal ring 20 to facilitate assembly and operation of the seal assembly and maintain the rotary seal ring 20 in an optimal position.

Other sealing members may seal the interfaces between different components of the mechanical seal assembly 10. For example, in the illustrative embodiment, a flat, annular elastomeric gasket 60 seals the interface between the seal gland assembly 40 and the housing 14. A holder gasket 160 seals two halves of a holder assembly 110, if the holder assembly 110 is split, as described below. A holder/shaft elastomeric member, illustrate as O-ring 142 seals between the rotary seal ring holder assembly 110 and the shaft 12. A stationary seal ring/gland elastomeric member, illustrated as O-ring 202, seals at an interface between the stationary seal ring 30 and the gland assembly 40 and provides radially inward pressure on the stationary seal ring 30. One skilled in the art will recognize that the mechanical seal assembly may have any suitable means for sealing between different components.

Figure 2:
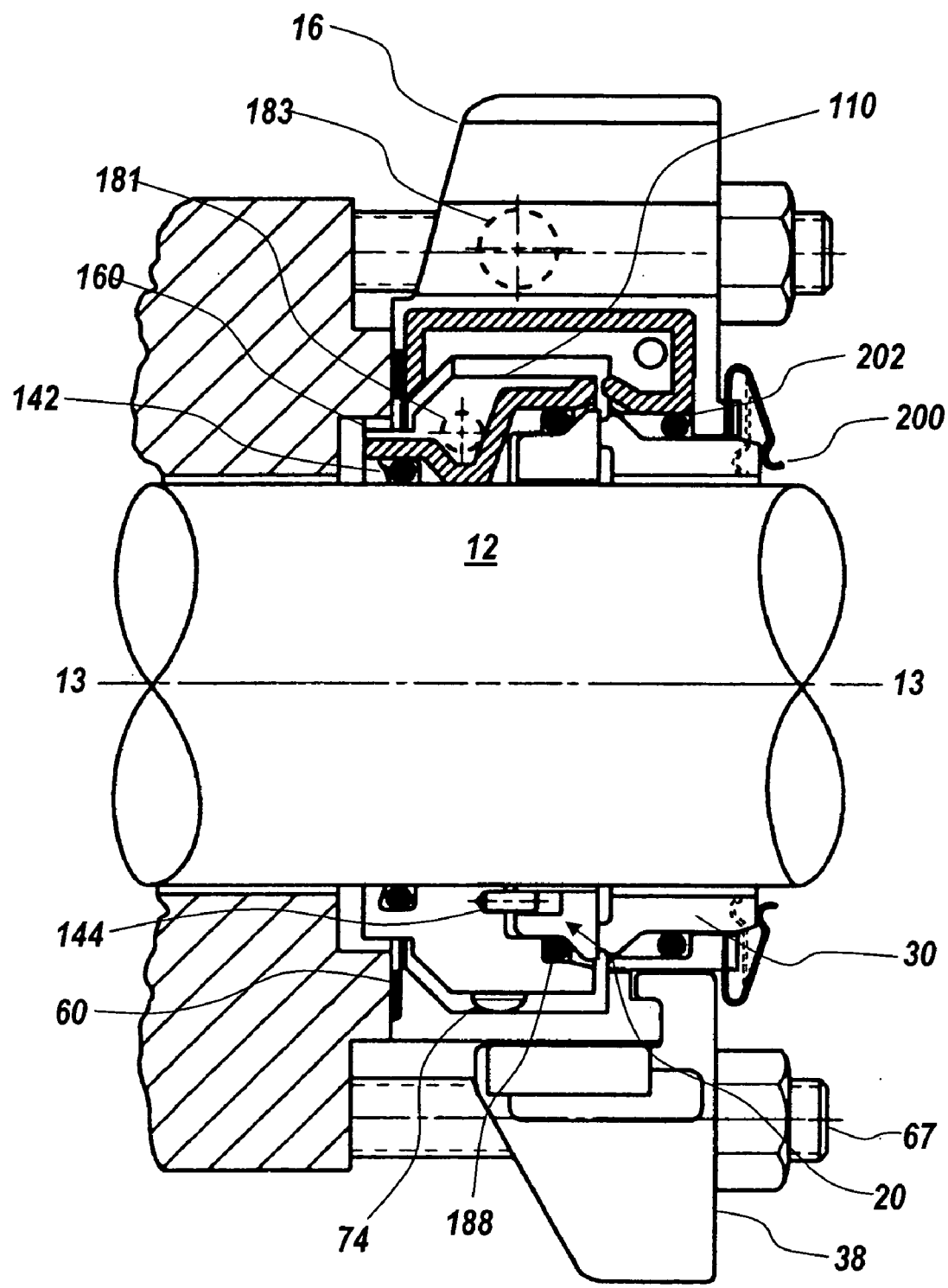
FIG. 2 is a cross-sectional view of the mechanical seal of FIG. 1 according to one embodiment of the invention.

In addition, the illustrative seal assembly 10 may also include an anti-rotation pin 144 extending axially between the rotary seal ring 20 and the holder assembly 110, as described below, to prevent relative rotary movement of the rotary seal ring and holder assembly. As shown in the embodiment of FIG. 2, a centering button 74 disposed between the radially outer surface 116 of the seal ring holder assembly 110 and the gland assembly 40 may be included to facilitate centering of the seal assembly around the shaft 12. As also shown in FIG. 2, a first socket head screw cap 181 secures the holder assembly 110, while a second socket head screw cap 183 secures the gland assembly 40. SB bolts 67 and bolt tabs 38 secure the gland assembly 40 to the equipment 14, as described in detail below.

Certain components of the illustrative seal assembly of the illustrative embodiments of the invention are similar to the mechanical seal assembly described in U.S. Pat. No. 5,571,268, the contents of which are herein incorporated by reference.

As illustrated in FIGS. 1-5, the holder assembly 110 for mounting the rotary seal ring 20 is disposed in a chamber 24 formed by the gland assembly 40, and spaced radially inward therefrom. It should be understood however, that the holder assembly 110 need not be disposed within the gland assembly 40. Rather, the holder assembly 110 can be axially spaced from the gland assembly 40.

The holder assembly 110 is designed and configured to facilitate installation of the rotary seal ring 20 therein, as well as overall operation of the mechanical seal. According to an illustrative embodiment, the radially inner surface 124 of the holder assembly 110 is configured to facilitate installation of the rotary seal ring 20 in the holder assembly 110 and improved squaring of the rotary seal face 21 to the shaft 12.

Figure 6:
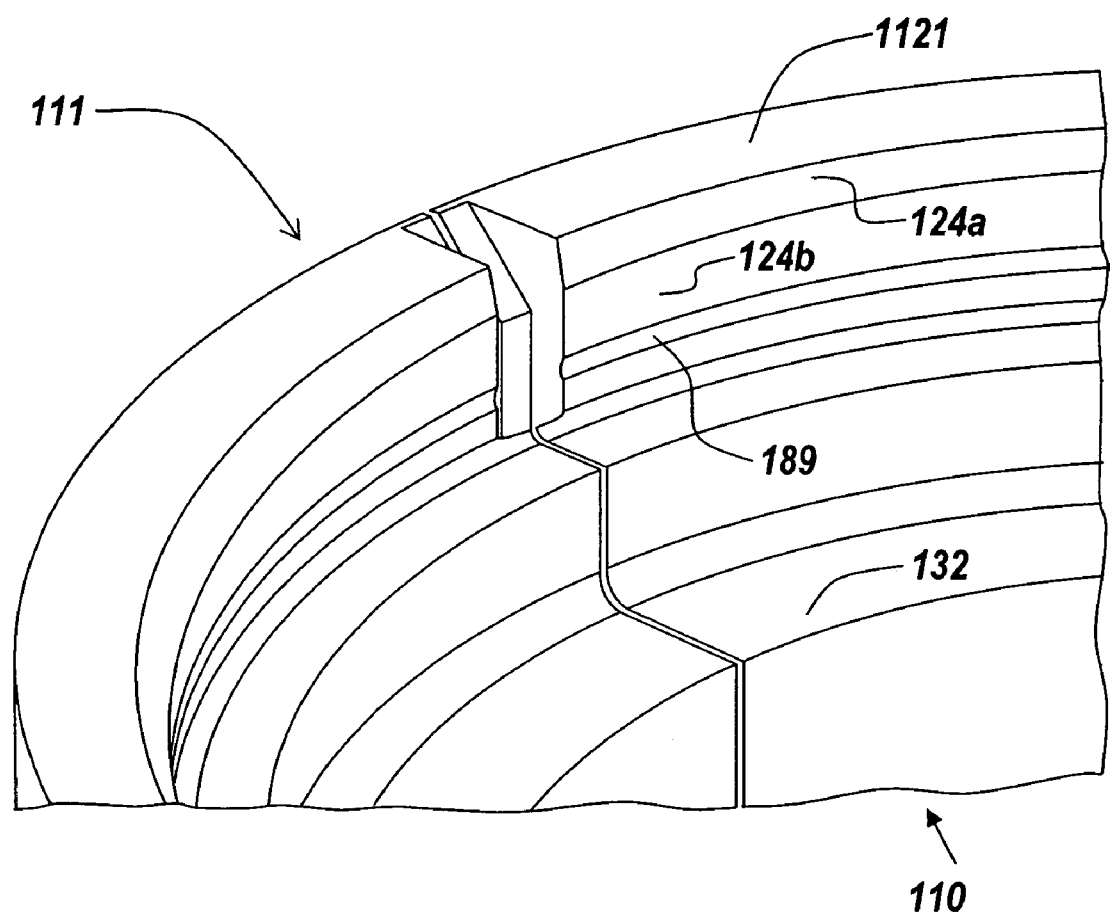
FIG. 6 is a perspective view of an axially outer portion of the rotary seal ring holder of the mechanical seal of FIG. 1 according to one illustrative embodiment of the invention.
Figure 7:
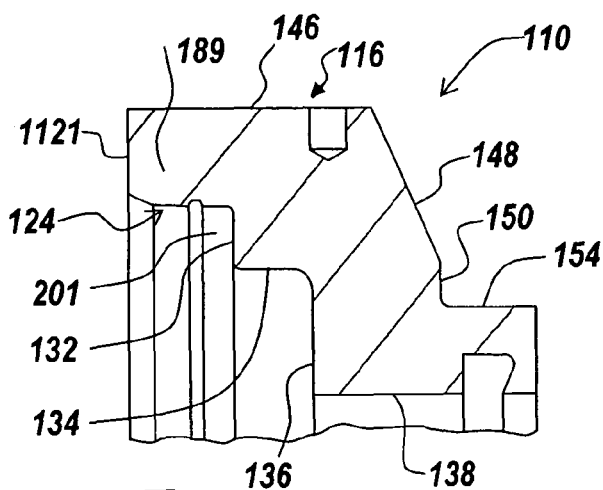
FIG. 7 is a cross-sectional view of the rotary seal ring holder of FIG. 6.
Figure 8:
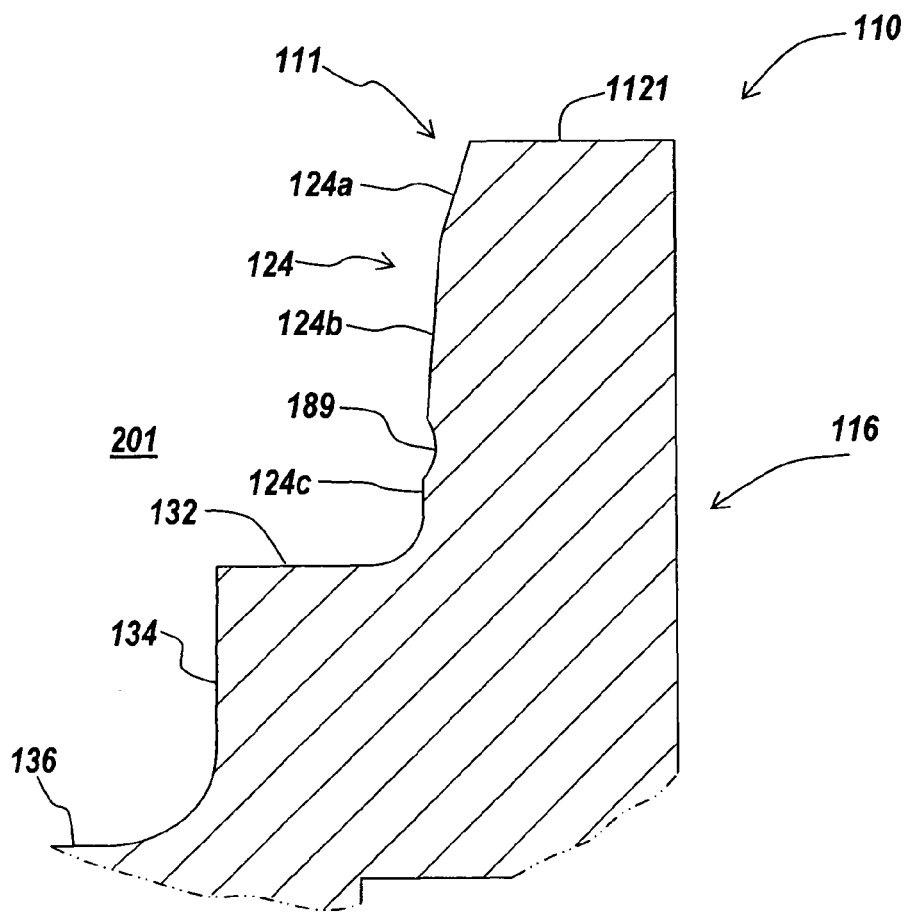
FIG. 8 is a cross-sectional view of a portion of the rotary seal ring holder of FIG. 6.

FIGS. 6-9 illustrate the holder assembly 110 of one embodiment of the invention in greater detail. FIG. 6 is a perspective view of the axially outer end 111 of the holder assembly 110. As shown, the holder assembly radially inner surface 124 includes two sloped faces 124a, 124b extending from the axially outer end 111, such that the inner surface 124 tapers through two stages from a relatively wide opening at the axially outer end 111 to the narrower space 201 for receiving the rotary seal ring 20. As shown, the radially inner surface 124 thus forms a double angled lead-in chamfer extending from the axially outer end 111 of the holder 110 along the inner wall to the groove 189. In the illustrative embodiment, the first sloped face 124a comprising the first stage forms a radially inward face that slopes radially inward from the front, radially-extending wall 1121 at the axially outer end 111 of the holder assembly 110. The first sloped face terminates at, and transitions into, the second sloped face 124b. The second sloped face 124b comprising the second stage extends radially inward at a slope from the first sloped face 124a and terminates in an axially-extending flat face 124c, or other intermediate surface. The illustrative intermediate surface 124c extends generally parallel to the axis 13. The intermediate surface, such as flat face 124c in turn extends to and intersects a stepped, axially inward-extending wall 132, defining the axially inner end of the space 201 for receiving the rotary seal ring 20. Alternatively, the holder assembly 110 can omit the axially-extending flat face 124c, such that the second sloped face 124b extends to and intersects with axially inward extending wall 132. Furthermore, those of ordinary skill in the art will recognize that the lead-in chamfer to the space 201 at the axially outer end 111 of the inner surface 124 may include more than two radially inward sloping faces.

The multi-angled lead-in chamfer facilitates insertion of the rotary seal ring 20 and O-ring 188 in the space 201 while the holder 110 is coupled to the shaft 12.

Figure 9:
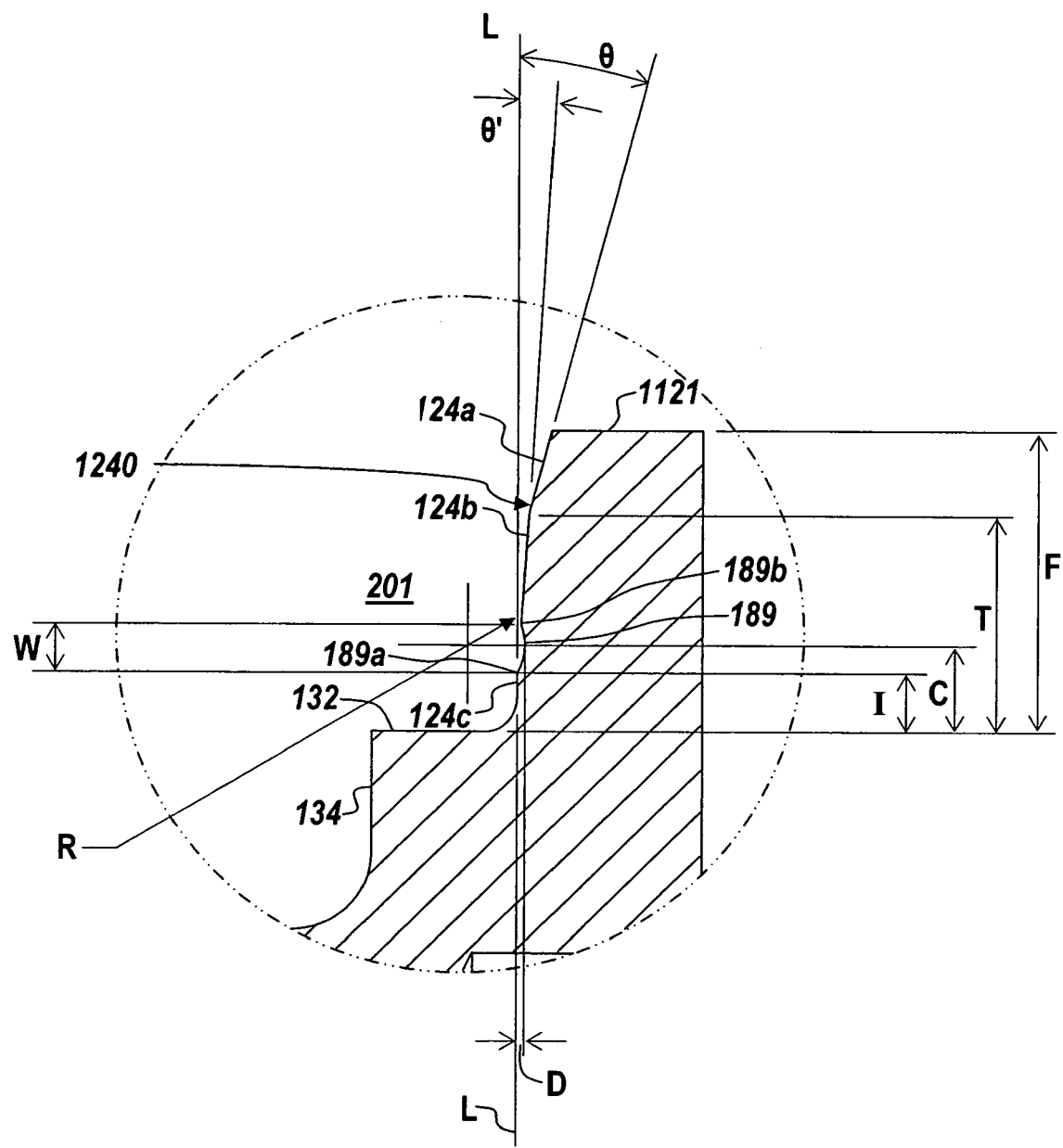
FIG. 9 is a cross-sectional detailed view of the rotary seal ring holder of FIG. 6, diagramming particular angles and lengths according to one embodiment of the invention.
Figure 10:
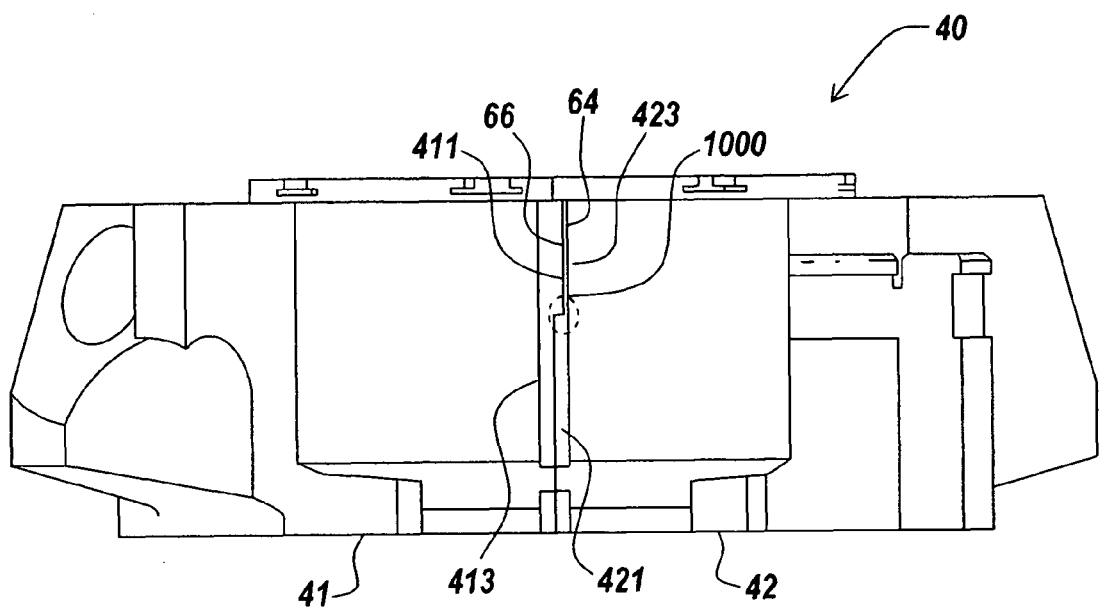
FIG. 10 is a side view of a gland assembly suitable for use in the mechanical seal assembly according to an illustrative embodiment of the invention.

As shown in detail in FIG. 9, the first radially inwardly sloped face 124a extends at a first angle θ transverse to an axis, illustrated by phantom line L, which is parallel to the axis 13 and which intersects the axially extending radial flat face 124c or the axially extending inner side of the space 201 if the holder does not include the flat face 124c. In the illustrative embodiment, the first angle θ at which the first radially inward sloped face 124a extends is between about 10 degrees and about 20 degrees and is preferably about 15 degrees with respect to the phantom line L. One skilled in the art will recognize that the first radially inward sloping face 124a may extend at any suitable angle and is not limited to the illustrative range.

The second radially inward sloped face 124b extends at a second angle θ' that slopes relative to the axis L, as shown in FIG. 9. In the illustrative embodiment, the second angle θ' is smaller than the first angle θ. The illustrative second angle θ' extends between about 2 and about 10 degrees and is preferably between about 3 and about 4 degrees and most preferably about 3.5 degrees relative to the phantom line L. One skilled in the art will recognize that the second radially inward sloping face 124b may extend at any suitable angle and is not limited to the illustrative range.

As shown in FIG. 9, the interface/transition point 1240 between angled faces 124a and 124b is preferably spaced a selected distance T from the wall 132. The front, radially-extending wall 1121 at the axially outer end 111 of the holder assembly 110 is spaced from the wall 132 by a distance F. The particular distances may be selected according to the particular application, size of the O-ring 188 used, size of the overall seal and other factors, and can be easily determined by one skilled in the art. One skilled in the art will recognize that the angled and flat surfaces of the inner surface 124 may have any suitable configuration, length and distance from other components of the holder assembly 110 and that the invention is not limited to the illustrative embodiment.

A pair of successive radially inward stepped surfaces forms a second, axially extending, face 134 and a third, axially extending, face 138, respectively, of the rotary seal ring holder 110. The radially inner surface 124 and the third face 134 have a radially inward-extending first wall 132 integrally formed therebetween. In the illustrative embodiment, an axially-extending flat (i.e., non-sloped) face 124c, or other intermediate surface, extends between the second radially inward sloping face 124b and the radially-extending first wall 132. In an alternative embodiment, the second radially inward sloping face 124b extends to and terminates in the radially-extending first wall 132. As shown, the third face 134 and the fourth face 138 have a radially inward extending second wall 136 integrally formed therebetween. The diameter of the fourth face 138 is preferably equal to or slightly greater than the diameter of the shaft 12, to which the holder assembly 110 is to be attached.

In a preferred embodiment, the O-ring 188 for sealing between the rotary seal ring 20 and the rotary seal ring holder 110 seats in a groove 189, such as a detent groove, formed on the radially inner surface 124 of the holder assembly 110. The detent groove 189 is sized, located and configured to receive a top, radially outer side of the O-ring 188 to seat the O-ring 188 relative the holder assembly 110 during installation without compromising performance. The detent groove 189 preferably seats the O-ring 188 at the intersection of the first wall 132 and radially inner surface 124 of the holder assembly, such that the O-ring preferably contacts, or is in close proximity with, the first wall 132, the inner surface 124 and the radially outer surface 184 of the rotary seal ring 20. Alternatively, the detent groove 189 seats the O-ring in another location between the rotary seal ring holder assembly 110 and the rotary seal ring 20.

Figure 3:
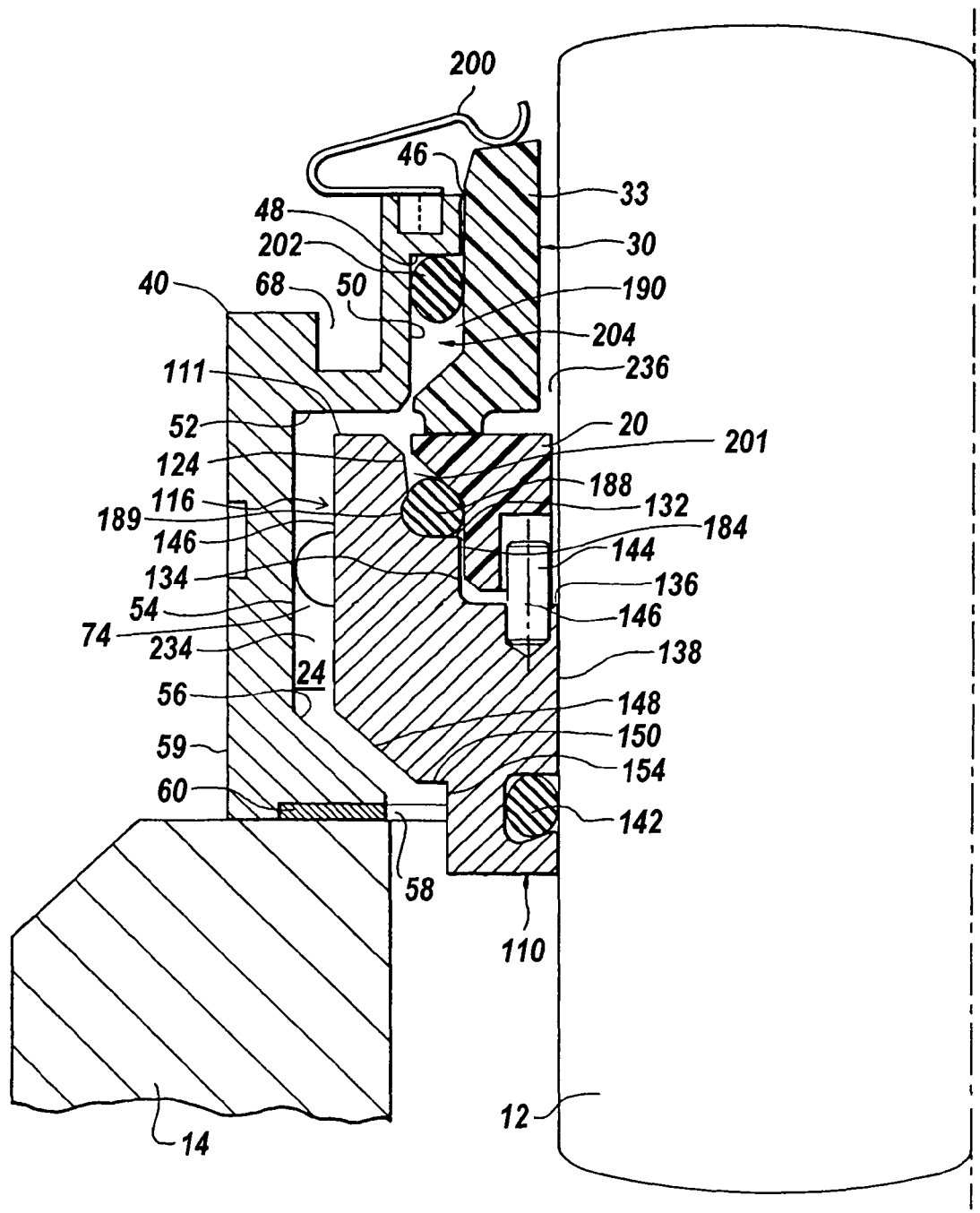
FIG. 3 is a fragmentary cross-section view of the mechanical seal of FIG. 1.
Figure 4:
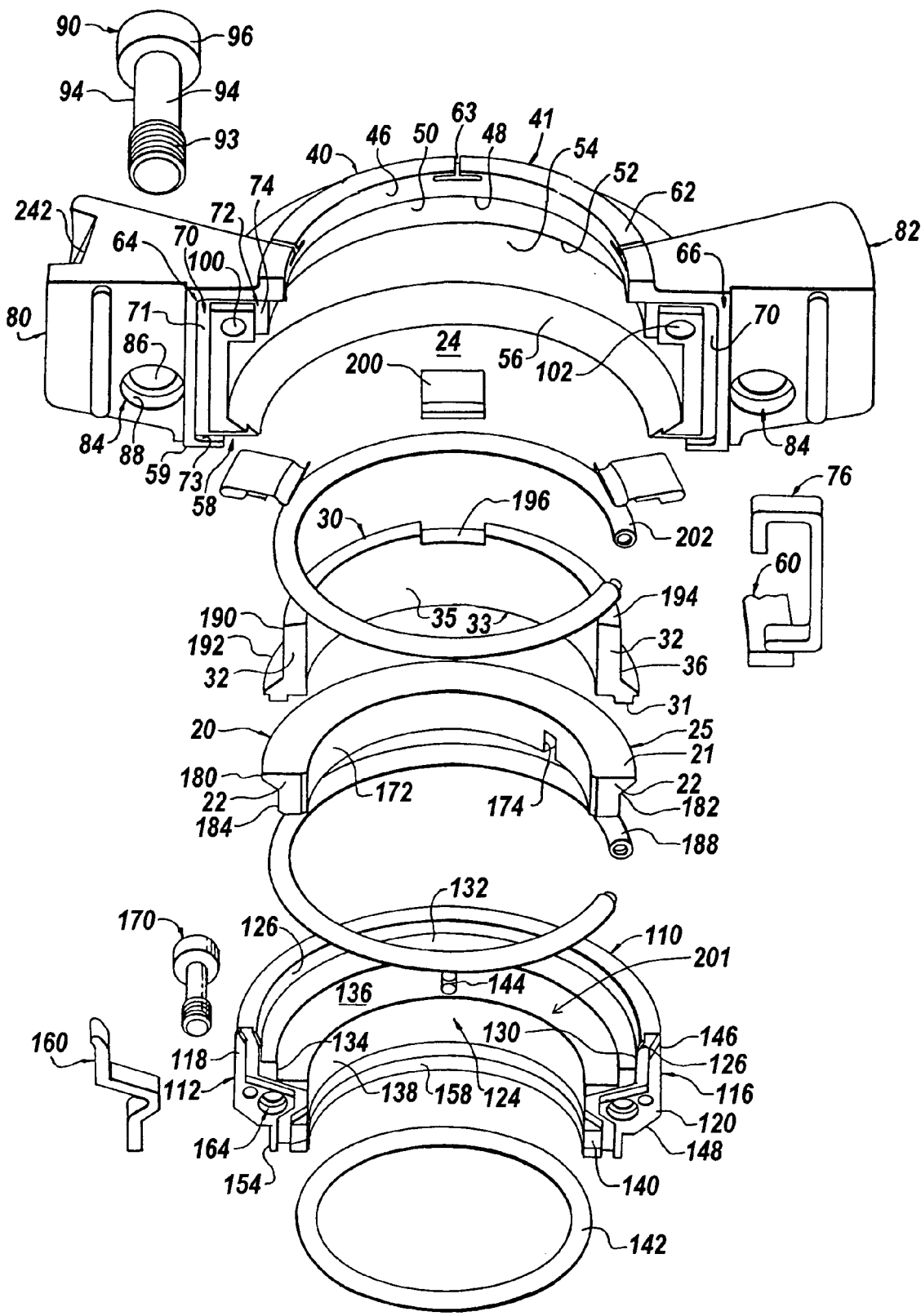
FIG. 4 is an exploded unassembled view of one half of the mechanical seal of FIG. 1 taken along line 3-3.

When seated in the detent groove 189, the O-ring preferably abuts the second and third outer surfaces 182, 184 of the rotary seal ring 20, as shown in FIGS. 2-4.

In the illustrative embodiment, the detent groove 189 is formed on the second radially-inwardly sloping face 124b of the holder assembly 110. In the embodiment shown in FIG. 9, the axially inner end 189a of the detent groove 189 aligns with the axially inner end of the second radially-inwardly sloping face 124b (i.e., where the second radially-inwardly sloping face 124b intersects the axially-extending flat face 124c).

In the illustrative embodiment, the slope of the angle θ' for the second radially-inward sloping face 124b preferably starts at the axially inner side 189a of the detent groove 189. In this manner, the axially outer side 189b of the detent groove 189 is radially outward of the axially inner side 189a of the detent groove 189, due to the slope in the surface where the detent groove 189 is formed.

Alternatively, the detent groove 189 may be formed on another face of the radially inner surface 124, preferably spaced from the wall 132 to facilitate sealing against the rotary seal ring 20.

The detent groove 189 is relatively shallow and preferably has a depth significantly less than the nominal diameter D' of the O-ring 188. For example, in the illustrative embodiment, the detent groove is a shallow, curved annular depression in the surface of the inwardly sloping face 124b. The illustrative detent groove 189 is curved in two dimensions (preferably radially and axially), forming a surface similar to a radially outer half of a torus to match the radially outer surface of the O-ring 188. The detent groove 189 is preferably sized and dimensioned to seat and retain the O-ring 188 in an optimal position. In the illustrative embodiment, the detent extends a depth D from the flat face 124c on the radially inner surface 124 of the holder assembly 110. The ratio of the depth D to the nominal diameter D' of the associated O-ring 189 is preferably between about 0.02 and about 0.10, and more preferably between about 0.03 and about 0.05. The detent groove 189 has a shape across the width W formed by an arc having a radius R. The ratio of the radius R forming the detent groove 189 and the nominal diameter D' of the associated O-ring 188 that seats in the groove 189 is preferably between about 0.25 and about 0.50 and preferably between about 0.3 and about 0.4 and most preferably between about 0.33 and about 0.38. One skilled in the art will recognize that the detent groove 189 is not limited to this size, shape and configuration and may have any suitable size, shape and configuration suitable for retaining an associated O-ring 189 disposed about a rotary seal ring 20.

The axially inner end 189a of the detent groove 189 is preferably spaced from the radially-extending wall 132 by a distance I. The center of the detent groove 189 is spaced a distance C from the wall 132. One skilled in the art will be able to determine a suitable configuration, location and size of the detent groove 189 to properly position the O-ring 188. One skilled in the art will recognize that the invention is not limited to locating the detent groove 189 in the illustrative location and that the detent groove may be located at any suitable location on the radially inner surface 124 of the holder assembly.

The O-ring 188 seated by the detent groove 189 is preferably sufficiently resilient to place each of the rotary segment sealing faces in sealing contact with another segment, thereby forming a fluid-tight and pressure-tight seal. The O-ring 188 also functions, in cooperation with a biasing member, such as a spring, illustrated as a mechanical clip 200, as an axial resilient biasing means by floatingly and non-rigidly supporting the rotary seal ring 20 and the stationary seal rings 30 in axially spaced floating relation relative to the rigid walls and faces of the gland and holder assemblies 40, 110. This floating relationship was first described in U.S. Pat. No. 4,576,384, assigned to the assignee hereof, and is herein incorporated by reference.

The rotary seal ring 20 and O-ring 188 are inserted into the space 201 after the holder 110 is assembled on the shaft 12. Due to the double-tapered surface at the lead-in chamfer of the radially inner surface 124, less force is required to install the rotary seal ring 20 and O-ring 188 into position. The detent groove 189 receives and automatically centers the O-ring 188, placing the rotary seal surface 21 into position perpendicular to the axis of the shaft 12. The described configuration of the holder, with the multi-angled lead-in surface and detent groove reduces or eliminates the need to hold the seal face in position during installation.

The detent groove 189 allows for a rotary seal ring 20 with an O-ring 188 disposed already about the outer diameter to be inserted into the already tightened holder 110 by sliding the rotary seal ring/O-ring assembly axially into the holder 110 through the space 201 formed between the radially inner surface 124 and the shaft 12. The detent groove captures the O-ring to keep it in place during this assembly process. The design of the illustrative holder allows for the holder assembly 110 to be first tightened around the shaft 12, followed by insertion of the seal ring and O-ring The detent groove 189 thus facilitates the assembly of the face and elastomer inside the already tightened clamping holder 10.

Alternatively, the detent groove 189 may be formed on a radially inner surface of the holder assembly 110 that does not include the double-angled lead-in chamfer.

Referring back to FIGS. 3, 4 and 7, the holder segment outer surface 116 of the holder assembly 110 may have a first axially extending outer surface 146, a radially inward sloping second outer surface 148, and a radially inward stepped third outer surface 154. The third outer surface 154 and the second outer surface 148 form, in combination, a radially inward extending first outer wall 150. The outer surfaces of the holder assembly 110 are preferably spaced from the inner surfaces 54, 56 of the gland assembly 40. As shown in FIGS. 2 and 3, the first axially extending outer surface 146 faces an axially-extending inner gland face 54 on the gland 40, with the outer diameter of the first outer surface 146 being preferably less than the inner diameter of gland segment face 54. In a preferred embodiment, the outer diameter of the holder segment third outer surface 154 is less than the diameter of a face 56 of the gland segment opposite the surface 154 when the mechanical seal is assembled. This clearance allows the holder assembly 110 to seat within the gland assembly 40 for unobstructed rotational movement therein.

The fourth face 138 on the inner surface of the holder segment 112 has formed thereon an annular channel 140 for mounting a split shaft gasket, illustrated as O-ring 142. When mounted in the channel 140, the gasket 142 sealingly mates with the shaft 12, providing a fluid-tight seal along the holder and shaft interface (see FIGS. 2 and 3). The second wall 136 preferably has axially extending therefrom a cylindrical protrusion forming the anti-rotation pin 144. The protrusion 144 operates as a mechanical rotary means by biasing the rotary seal ring 20 into rotational movement, as described in greater detail below.

Figure 5:
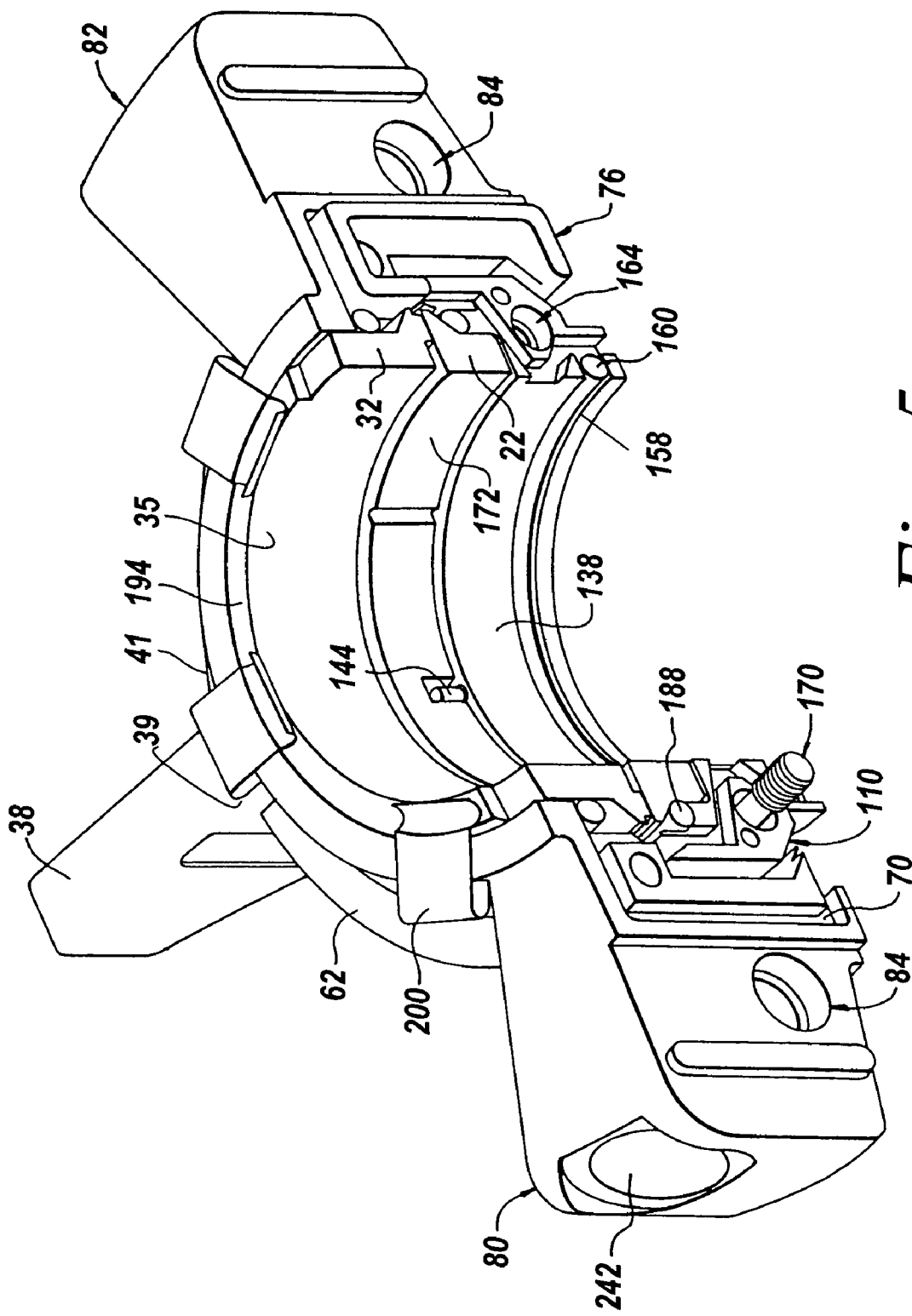
FIG. 5 is a perspective view of one-half of the mechanical seal of FIG. 1.

The holder segments 112, 114 may also have formed on each split holder seal face 118 and 120 a holder gasket groove 158, having the configuration illustrated in FIGS. 1-5. A holder gasket 160, complementary in shape to the groove 158, seats in groove 158. The holder gasket 160, when seated in the groove 158, may extend beyond the holder seal faces 118, 120, as best shown in FIG. 5. The exposed portion of the gasket 160 seats in a complementary groove formed in the opposite holder segment seal face. This arrangement provides for a fluid-tight seal at pressures higher than a selected value, as described above. The gasket is preferably composed of any suitable deformable material, such as elastomeric rubber.

The holder segments 112, 114 may also have a fastener-receiving aperture 164 that mounts screw 170 for securing the holder segments 112, 114 together. The screws 170 are mounted in and positively maintained by the fastener-receiving apertures 164.

The rotary seal ring assembly 20 also may include a pair of arcuate rotary seal ring segments 25, 25', while the stationary seal ring assembly may include a pair of arcuate stationary seal ring segments 33, 33'. Each seal ring segment has a smooth arcuate sealing surface 21, 31, respectively, and a pair of segment sealing faces 22, 32, respectively. The smooth arcuate sealing surface 21, 31 of each seal ring is biased into sealing contact with the corresponding surface 21, 31', respectively, of the other seal ring segment to create a fluid-tight seal. Similarly, the segment sealing faces 22, 32 of the ring segments 25 and 33 are biased into sealed relationship with each other to form each of the seal rings 20 and 30. Thus, these individual seal faces provide a fluid-tight seal operable under a wide range of operating conditions, including a vacuum condition.

The illustrative rotary sealing element 20, illustrated as arcuate rotary seal ring segments 25, preferably has a substantially smooth arcuate inner surface 172 and an outer surface comprising several surfaces 180, 182, 184, as best shown in FIG. 4. The inner surface 172 may have formed thereon a generally rectangular notch 174. The notch 174 mounts over the holder protrusion 144. The illustrative rotary segment outer surface has an axially extending first outer surface 180 that terminates in a radially inward sloping second outer surface 182 or abutment, and an axially extending third outer surface 184, about which the O-ring 188 is disposed. The rotary segment 25 also preferably has the smooth arcuate sealing surface 21 disposed at the top of the ring 20. The inner diameter of the rotary seal segments inner surface 172 is greater than the diameter of the shaft to permit mounting thereon. The diameter of the rotary seal segment third outer surface 184 is equal to or slightly less than the diameter of the holder segment third face 134, for mounting engagement with the holder assembly 110. The diameter of the rotary seal segment first outer surface 180 is less than the inner diameter of the holder segment tapering inner surfaces 124a, 124b, and greater than the diameter of the holder third face 134. One skilled in the art will recognize that the rotary seal ring 20 may have any suitable configuration for interfacing with and sealing against another sealing element, such as the stationary seal ring 30.

Although the illustrated seal ring 20 has an abutment 182 formed at the outer surface, those of ordinary skill will recognize that a non-sloping stepped annular surface could also be employed.

As best shown in FIG. 4, the illustrative stationary seal ring 30 may similarly include a pair of arcuate seal ring segments 33, 33', each identical or substantially identical to the other. The illustrative stationary seal ring arcuate segments 33 have a substantially smooth arcuate inner surface 35 extending parallel to the first axis 13 and an outer surface 36. The stationary seal ring segment outer surface 36 preferably has an axially extending first outer surface 190 that terminates in a radially outward extending abutment 192. The stationary seal ring 30 preferably has a substantially smooth arcuate top surface 194 and a smooth arcuate ring sealing surface 31 disposed at the bottom of the ring. The illustrative stationary seal segment 33 also has a recess 196 formed along the top surface 194. A mechanical clip 200, mechanically coupled to a top surface 62 of the gland assembly 40 via a clip groove 63, seats in the recess 196. This arrangement helps align and seat the stationary seal ring 30 in the chamber 24, as well as functioning as a mechanical impedance for preventing the stationary seal ring 30 from rotating with the shaft 12 and the rotary seal ring 20.

The inside diameter of the stationary segment inner surface 35 is greater than the shaft diameter, and is greater than the diameter of the inner surface 172 of the rotary seal ring 20, thereby allowing relative motion therebetween. Therefore, the stationary seal ring 30 stays stationary while the shaft 12 rotates. An elastomeric member, e.g., O-ring 202, provides a radially inward biasing force sufficient to place the segment sealing faces 32 of stationary seal ring segment 33 in sealing contact with the other stationary seal ring segment. Additionally, O-ring 202 forms a fluid-tight and pressure-tight seal between the gland assembly 40 and the stationary seal ring 30. The O-ring 202 seats in a first mounting region 204 defined by the gland segment first wall 48, the gland second face 50, the stationary ring outer surface 190, and the stationary ring abutment 192. In a preferred embodiment, the abutment 192 forms an angle relative to the stationary ring outer surface 190 preferably in the range of about 30° to about 60°, and most preferably about 45°. The stationary seal ring 30 is preferably composed of a carbon or ceramic material, such as alumina or silicon carbide and the like.

The biasing member, illustrated as a mechanical clip 200 in the illustrative embodiment, also functions as an axial biasing means by providing resilient support for the stationary and rotary seal rings 20, 30 by axially biasing the seal rings such that the stationary and rotary sealing surfaces 21 and 31 are disposed in sealing contact with each other. As illustrated in FIG. 3, the seal rings 20, 30 are floatingly and non-rigidly supported in spaced floating relation relative to the rigid walls and faces of the gland and holder assemblies 40, 110. This floating and non-rigid support and spaced relationship permits small radial and axial floating movements of the rotary seal segments 25, 25' and the stationary seal segments 33, 33' with respect to the shaft 12, while still allowing the rotary sealing surface 21 to follow and to be placed in sealing contact with the smooth arcuate sealing surface 31 of the stationary seal ring 30. Thus, the rotary and stationary seal ring sealing surfaces 21 and 31 are self-aligning as a result of this floating action.

The illustrative mechanical seal assembly 10 may also include an improved seal gland assembly 40 to improve operation of the seal assembly, as shown in FIGS. 10-15. The illustrative seal gland assembly 40 has a pair of gland segments 41, 42 that mate to form the annular seal gland assembly 40.

In the illustrative embodiment, as shown in FIG. 10-15 the gland segments 41, 42 are configured to engage each other to facilitate assembly and operation of the mechanical seal assembly. The illustrative gland assembly segments 41, 42 have an interlock mechanism to facilitate engagement of the two segments 41, 42. In contrast to prior gland designs, each gland segment 41, 42 has at least one non-flat, shaped interfacing surface 64, 66 to transmit a bolting force to the other mating gland half and prevent sliding of the gland halves relative to each other. In the illustrative embodiment, the gland segment interfacing surfaces have stepped faces forming interlocking protrusions 411, 421, respectively, and recesses 413, 423, respectively formed on at least one interface between the two segments. Each protrusion 411, 421 fits into the corresponding recess 413, 423 such that an overlap 1000 between the two segment interfacing surfaces forms to engage the corresponding gland segment. The raised surface transmits the bolting force applied to the gland and facilitates connection and alignment of the gland segment halves. The overlapping components reduce and/or prevent a separation force at the gland splits caused by bolt glands that bolt the gland assembly to the equipment housing.

Figure 11:
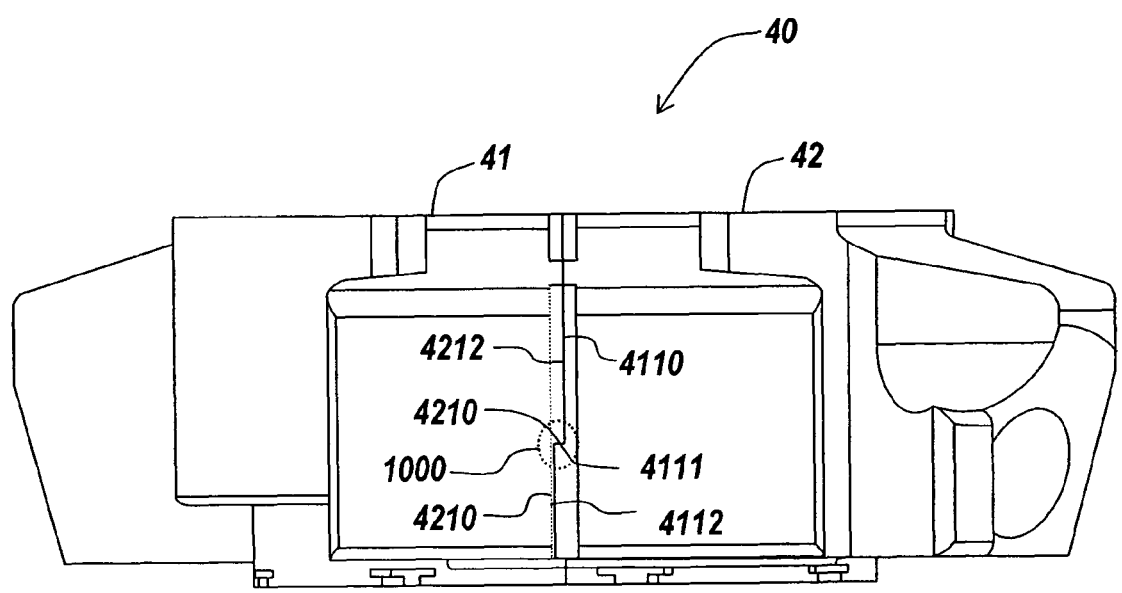
FIG. 11 is another side view of the gland assembly of FIG. 10.
Figure 12:
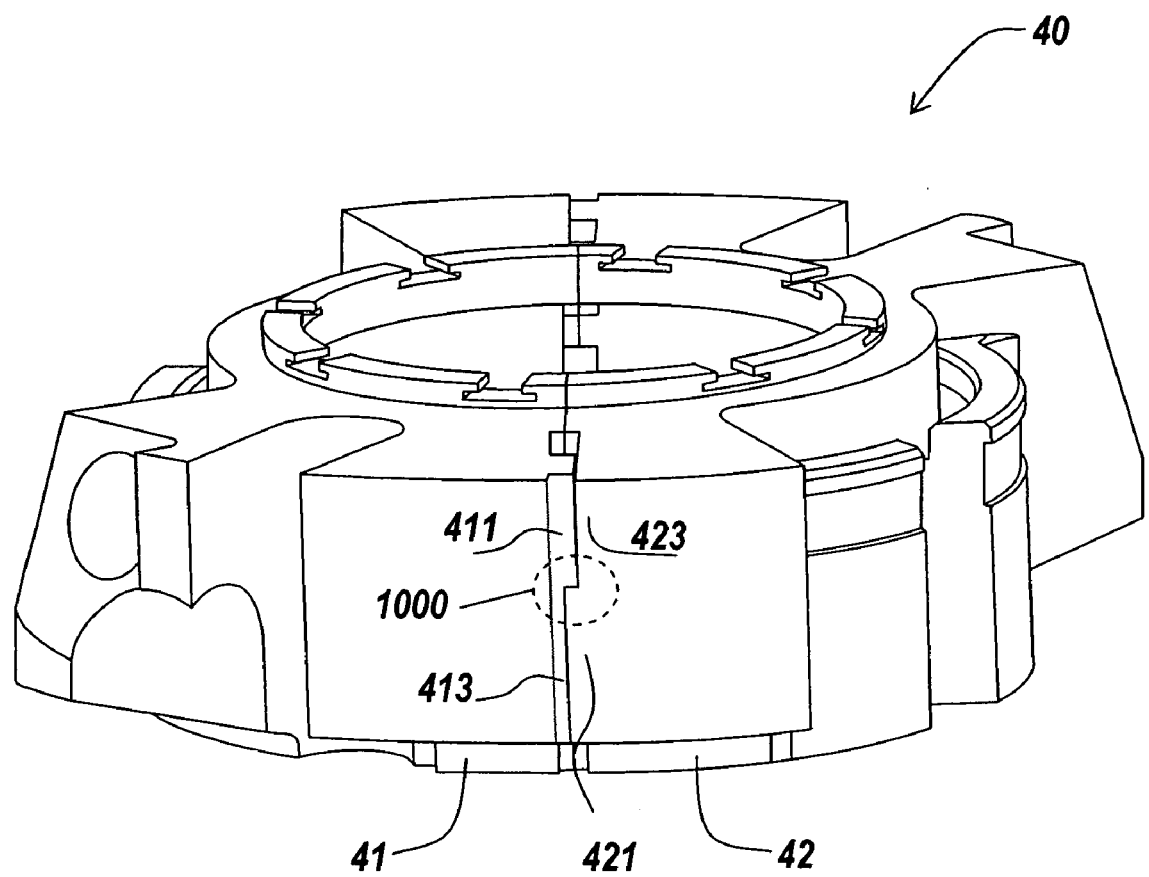
FIG. 12 is a perspective view of the gland assembly of FIG. 10.
Figure 14:
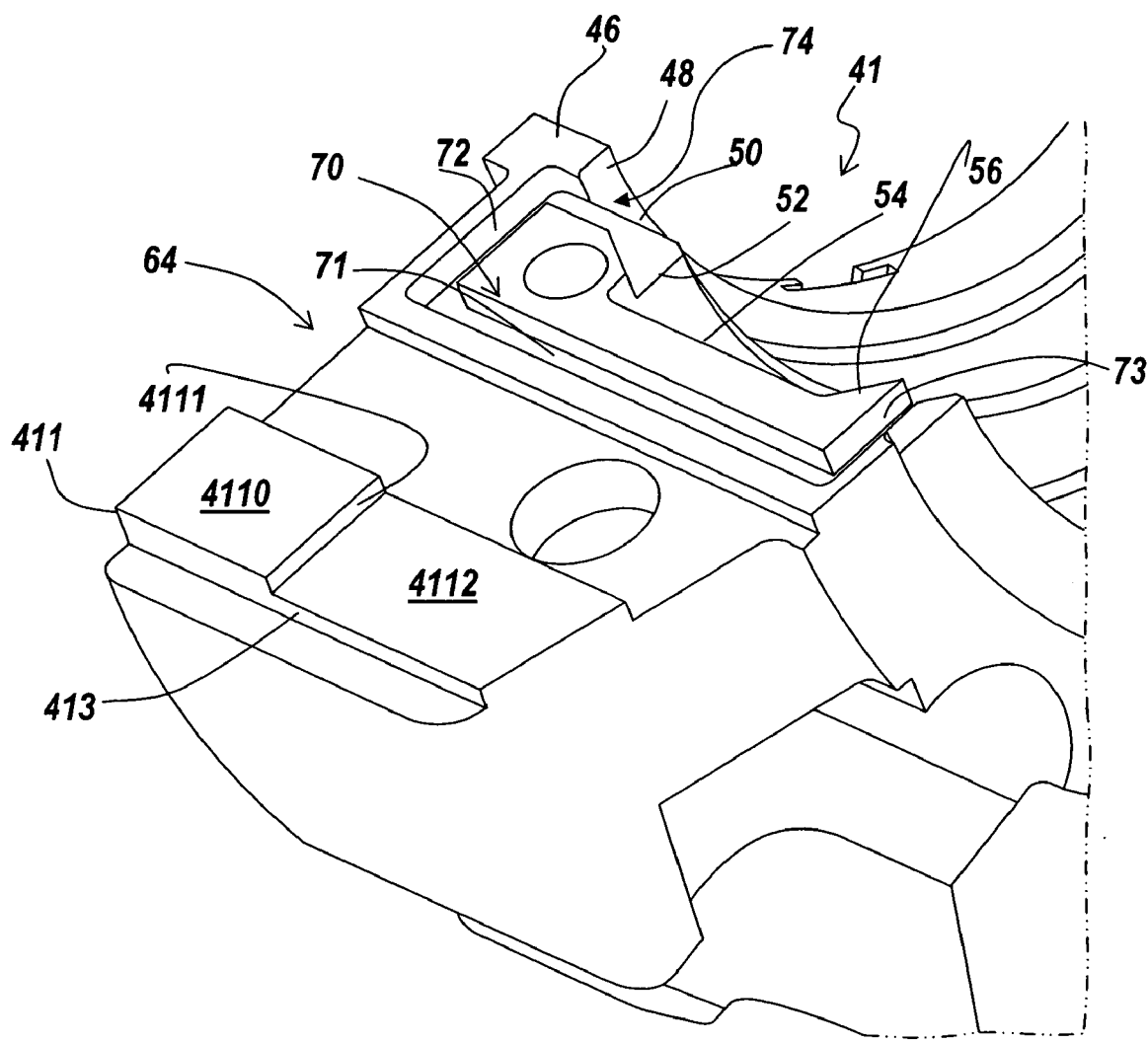
FIG. 14 is a detailed, close-up view of an interfacing region of the gland assembly according to an illustrative embodiment of the invention.
Figure 15:
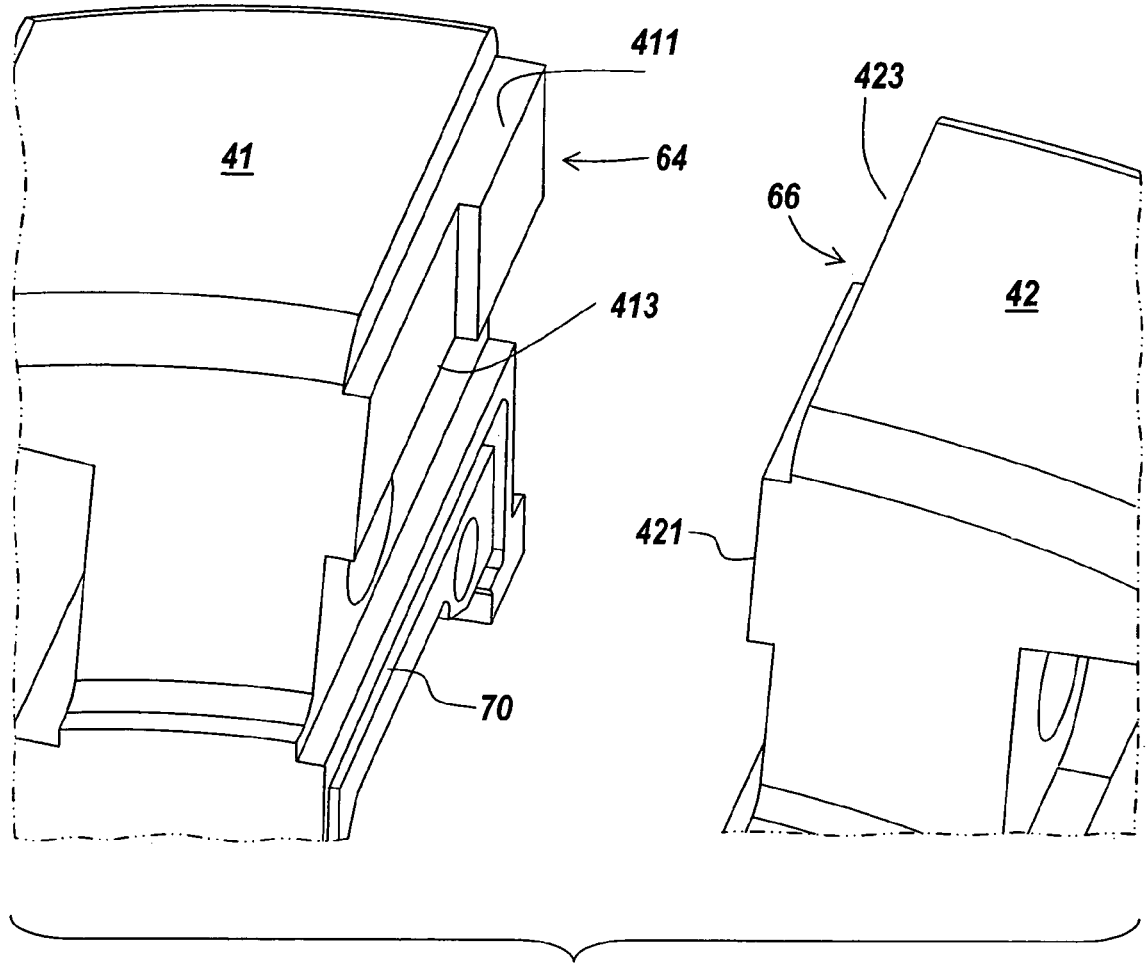
FIG. 15 is a detailed, close-up view of the gland segments at the overlapping, interacting surfaces.

In the illustrative embodiment, as shown in FIGS. 11 and 14, each interfacing surface is a stepped surface having a flat, axially extending face 4110, 4210 and a flat, radially-extending face 4111, 4210 extending perpendicular from each flat, axially-extending face 4110, 4210, respectively, to define the protrusion 411, 421. The flat, radially-extending faces 4111, 4210, extend to flat, axially extending faces 4112, 4212 stepped from and parallel to the faces 4110, 4210 to define the recesses 413, 423 on each interfacing surface. Preferably, the flat, axially extending surfaces, 4111, 4210, which mate to form the overlap 1000, extend substantially perpendicular to the longitudinal axis 13 of the mechanical seal assembly, thereby allowing a bolt force translated to the gland segments to transmit to the other gland segment without causing separation of the gland segments. One skilled in the art will recognize that the protrusions and corresponding recesses may have any suitable configuration.

Those of ordinary skill will readily recognize that other interfacing and/or interlocking arrangements can be employed. For example, each interfacing surface may have several protrusions and/or recesses, or otherwise-formed overlapping surfaces, which may be formed at any suitable location on the interfacing surfaces.

Referring to FIGS. 3, 4, 13 and 14, each illustrative gland segment 42 may have an inner surface that has a first face 46, and an integrally formed and stepped second face 50 that extends radially outward from the first face 46. The first face 46 and the second face 50 form, in combination, a first connecting annular wall 48. A stepped third face 54 extends radially outward from the second face 50 and forms, in combination therewith, a second annular connecting wall 52, which may be stepped, and/or include a sloping surface extending to the second face 50. A sloped fourth face 56 extends radially inward from the gland segment third face 54. The gland segment inner surface formed by faces 46, 50, 52, 54 and 56 defines the space 24 for receiving the holder assembly 110, as described above.

Figure 13:
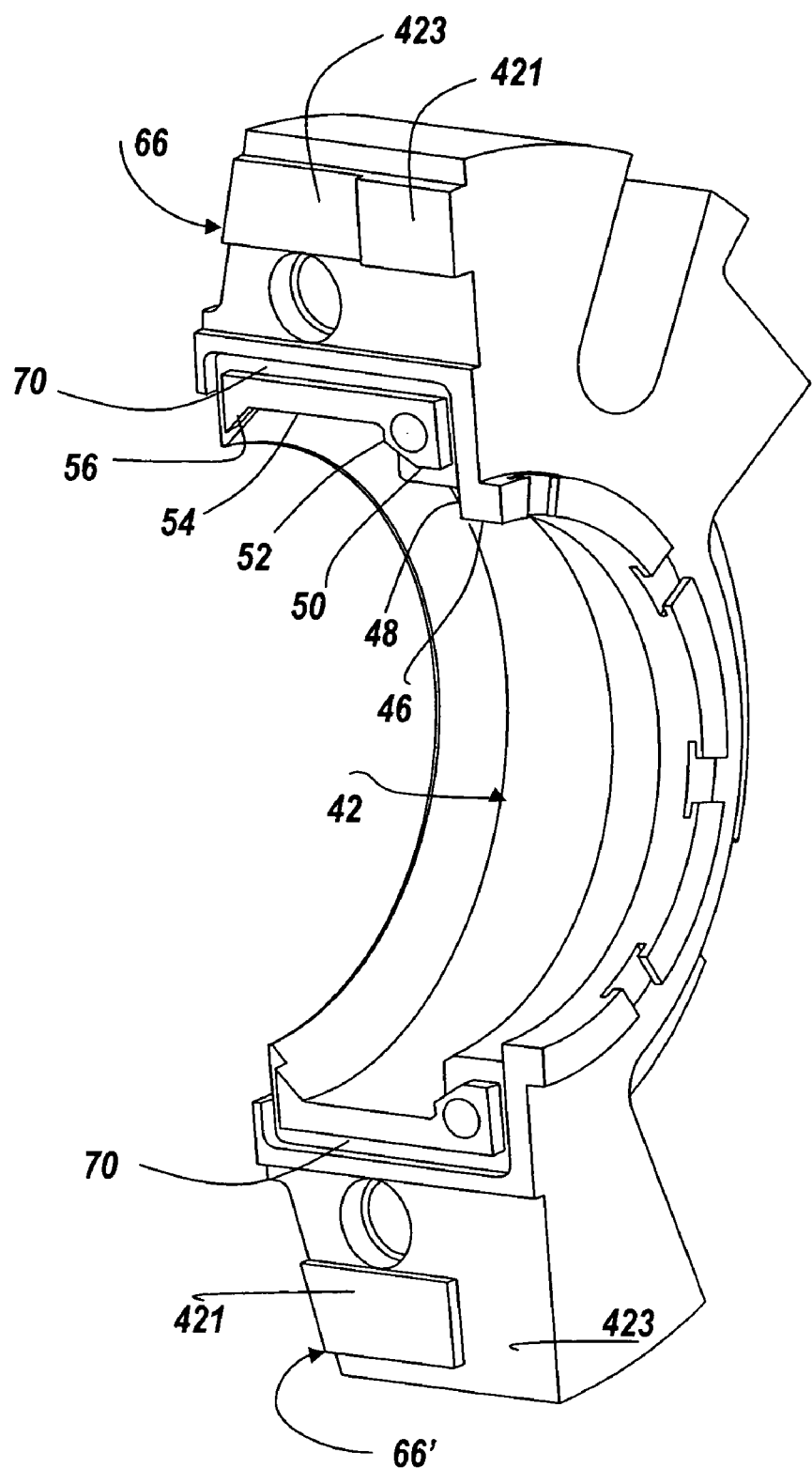
FIG. 13 is a perspective view of one segment of the gland assembly showing the overlapping interfacing surfaces of both ends of the gland segment.

As shown in FIG. 13, the second gland seal face 66' of the gland segment 42 may also be shaped to interlock with a correspondingly shaped second gland seal face (not shown) of the first gland segment 41. In the illustrative embodiment, the second gland seal face 66' also includes a protrusion 421, and a recess 423, which are positioned opposite the protrusion and recess on the first gland seal face 66.

Each gland seal face 64, 66, 66' may also have formed thereon a gland gasket groove 70. FIG. 14 illustrates the gland seal face 64 of the first gland segment in detail, illustrating the groove 70. The illustrative groove 70 has a main axial portion 71 which extends from the gland second face 50 to the gland fourth face 56. Groove segments 72, 73, transverse to the main groove segment 71, extend along the second gland wall 52 and the gland fourth face 56, respectively, and groove segment 74, spaced radially inward from groove segment 71, extends along the gland segment second face 50.

An elastomeric gland gasket 76, complementary in shape to the gland groove 70, seats in the groove 70 of the gland. The gasket 76, when seated in the groove 70, may extend beyond the gland split faces 64, 66, as best shown in FIGS. 1, 4 and 5. The exposed portion of the gasket 76 is captured in a complementary groove formed on the split gland seal face of the other gland segment 42 when the gland segments 41, 42 are assembled. Capturing both ends of the gasket 76 between opposing split gland seal faces prevents the gasket 76 from extruding into the gap formed between the split gland seal faces when subjected to pressures higher than a selected maximum pressure. This double-capturing feature thus allows the gland segments 41, 42 to withstand greater pressures without developing pressure leaks, as well as relaxing the mechanical tolerances of other components of the mechanical seal 10. The gland gasket 76 is preferably formed from any suitable resilient material, such as elastomeric rubber. Further, although the gasket 76 has the illustrated shape, those of ordinary skill will recognize that the gasket 76 and its corresponding groove 70 can have any suitable geometric configuration.

Figure 16A:
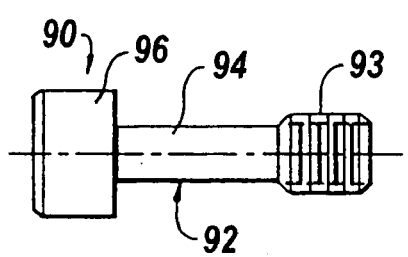
FIG. 16A is a side view of a gland or holder screw according to an embodiment of the invention.
Figure 16B:
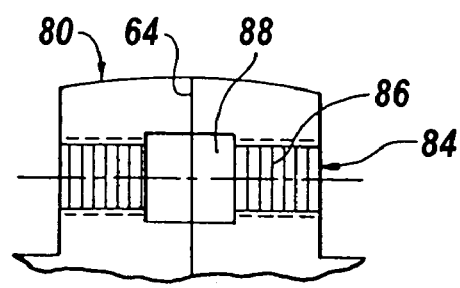
FIG. 16B is a broken perspective view of the screw housing of FIG. 1 according to an embodiment of the invention.

Each of the gland segments 41, 42 may also have integrally formed therewith a pair of screw housings 80, 82. Each screw housing has a transverse fastener-receiving aperture 84 formed substantially therethrough. The aperture 84 has a tapped smaller-diameter portion 86, and a concentric untapped larger-diameter portion 88, as shown in FIGS. 1, 16A and 16B. Preferably, the untapped portion 88 of the aperture 84 is disposed closest to the gland seal faces 64, 66.

The transverse aperture 84 mounts a screw 90 having the illustrated configuration. The screw 90 preferably has a main shaft 92 and a screw-head portion 96. The screw shaft 92 has a threaded distal portion 93 and an untapped proximal portion 94, as shown in FIGS. 1 and 16A. The outer diameter of the threaded portion 93 is greater than the outer diameter of the proximal portion 94. As illustrated in FIG. 16B, each screw 90 fastens together a pair of housings 80 and 82. When the threaded distal portion 93 of the screw 90 is screwed into the tapped portion 86 of the aperture 84, the distal portion 93 is positively maintained in the aperture 84. As the screw 90 further travels through the aperture 84, the screw distal end enters the untapped portion 88, or clearance gap of the aperture 84. In this orientation, the screw 90, although not snugly secured, is still positively maintained (i.e., not detachable) in the aperture 84. In a preferred embodiment, the diameter of the screw distal portion 93 is close to the diameter of the tapped smaller-diameter portion 86 of the screw housings 80,82.

Significant advantages are enjoyed by the screw 90 and the aperture 84 of the present invention. In particular, the screw 90 can be mounted in the fastener-receiving aperture 84 from any side of either gland segment 41, 42 prior to assembly, which is particularly useful in limited access installations, and is positively maintained in the screw housing 80. By preventing the screw 90 from completely detaching from the screw housing 80 prevents accidental loss of the screw 90 during assembly and disassembly, thus facilitating assembly of the seal while reducing installation time. The same construction pertains to the screw housings 82.

The gland assembly 40 may also have a housing gasket groove 58 formed along a bottom 59 of the gland assembly 40. The groove 58 seats the flat, annular elastomeric gasket 60. As illustrated in FIGS. 3 and 4, the gasket 60 preferably has an axial dimension greater than the depth of the groove 58, thereby providing a pressure-tight and fluid-tight seal between the mechanical seal 10 and the housing 14. In a preferred embodiment, the housing gasket 60 is pre-cut into two arcuate segments for mounting in each gland segment 41, 42. The housing gasket segments are preferably mounted in the groove 58 and secured thereto by an adhesive. This arrangement helps prevent leakage of the process medium along the seal 10 when mounted to the housing 14.

The illustrative gland assembly 40 may further include a plurality of bolt-tabs 38. The bolt-tabs 38 have a main body 37 that has integrally formed at one end an inserting-tab projection 39. The tab projection 39 mounts in an annular groove 68 formed around the periphery of the gland assembly 40. The angular position of the tabs can be adjusted by sliding the bolt-tab 38 and the tab projection 39 about the groove 68. The bolt-tabs 38 help secure the mechanical seal 10 to the housing 14 by seating mounting bolts (not shown). In use, the mounting bolt is inserted between a pair of adjacent bolt-tabs. The bolt-tabs 38 are further described in detail in U.S. Pat. No. 5,209,496, assigned to the assignee hereof and which is herein incorporated by reference.

The holder assembly 110, the gland assembly 40, and the screws 90 can be formed from any suitably rigid material, such as stainless steel.

Figure 17:
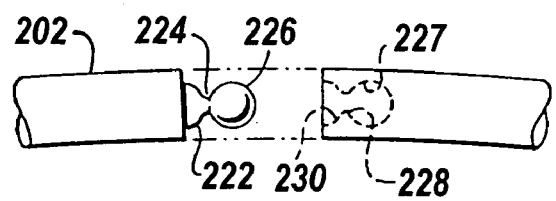
FIG. 17 is a sectional view of an elastomeric member.

In one embodiment of the invention, the O-rings 188 and 202 may be split to facilitate assembly as well. As generally illustrated in FIG. 17, identical ball and socket fastening mechanisms may be provided on the free ends of O-rings 188 and 202. At one end, O-ring 202 narrows into a substantially hemispherical shoulder portion 222 and, adjacent thereto, annular neck portion 224. Immediately adjacent neck portion 224 is a substantially spherical head portion 226. In fastening, head portion 224 is inserted into matching spherical socket portion 227 at the other end of O-ring 202 such that annular collar portion 228 surrounds and captures neck portion 224, and shoulder portion 222 is in intimate contact with annular jacket portion 230. Additionally, although the mechanical seal 10 and its associated components are depicted as sectional parts, the O-rings 188 and 202 are continuous and complete structures having the above configuration. However, the O-rings 188 and 202 are not limited to the illustrative embodiment and may have any suitable configuration. For example, the O-rings 188 and 202 may be solid or have an alternative fastening mechanism.

In assembly, the O-ring 188 is concentrically disposed about the rotary seal segments 25, preferably in contact with the rotary seal outer surfaces 182, 184, and the rotary seal segments 25, 25' then are mounted in the holder assembly 110, preferably already disposed about the shaft 12, by aligning the rectangular notch 174 of the rotary seal ring segment 25 with the axially extending anti-rotation holder protrusion 144. The O-ring disposed about the rotary segments 25 is further placed in sealing contact with the holder inner surface, preferably in the axially-extending flat face 124c, the holder first wall 132. As described above, the detent groove 189 receives and retains the O-ring 188, and the associated rotary seal ring 20, in an optimal position, while the multi-angled lead-in chamfer facilitates insertion of the O-ring 188 and rotary seal ring into the holder assembly 110. The O-ring 188 provides an inward radial force sufficient to place the rotary seal faces 22 of the seal segment 25 in sealing contact with each of the sealing faces 22 of the other rotary segment. The holder segments 112,114 are then secured together by tightening the screws 170 that are positively maintained in the fastener-receiving apertures 164. As shown in FIGS. 1-4, the rotary seal ring segments 25, 25' are spaced from the holder assembly inner surfaces 124, and are non-rigidly supported therein by the O-ring 188, thereby permitting small radial and axial floating movements of the rotary seal ring 20.

The stationary seal ring segments 33 are concentrically mounted over the shaft 12, and secured together by O-ring 202. The O-ring 202 applies a radially inward force to the stationary seal ring outer surface 36 sufficient to place the segment sealing faces 32 of each segment in sealing contact with each other.

The gland segments 41,42 are concentrically placed about the holder assembly 110, such that the faces engage, and the rotary and stationary seal rings 20,30, and are secured together by screws 90 that are mounted in and positively maintained by the fastener-receiving apertures in the screw housings 80 and 82. The screws 90 cannot be unintentionally removed from the mechanical seal 10 since they are secured to the gland assembly 40 by the inventive fastener-receiving aperture 84 and screw 90. Additionally, mounting the screws 90 does not necessitate rotating the shaft since the screws 90 can be secured from the same or opposite sides of the gland assembly 40.

Figure 18:
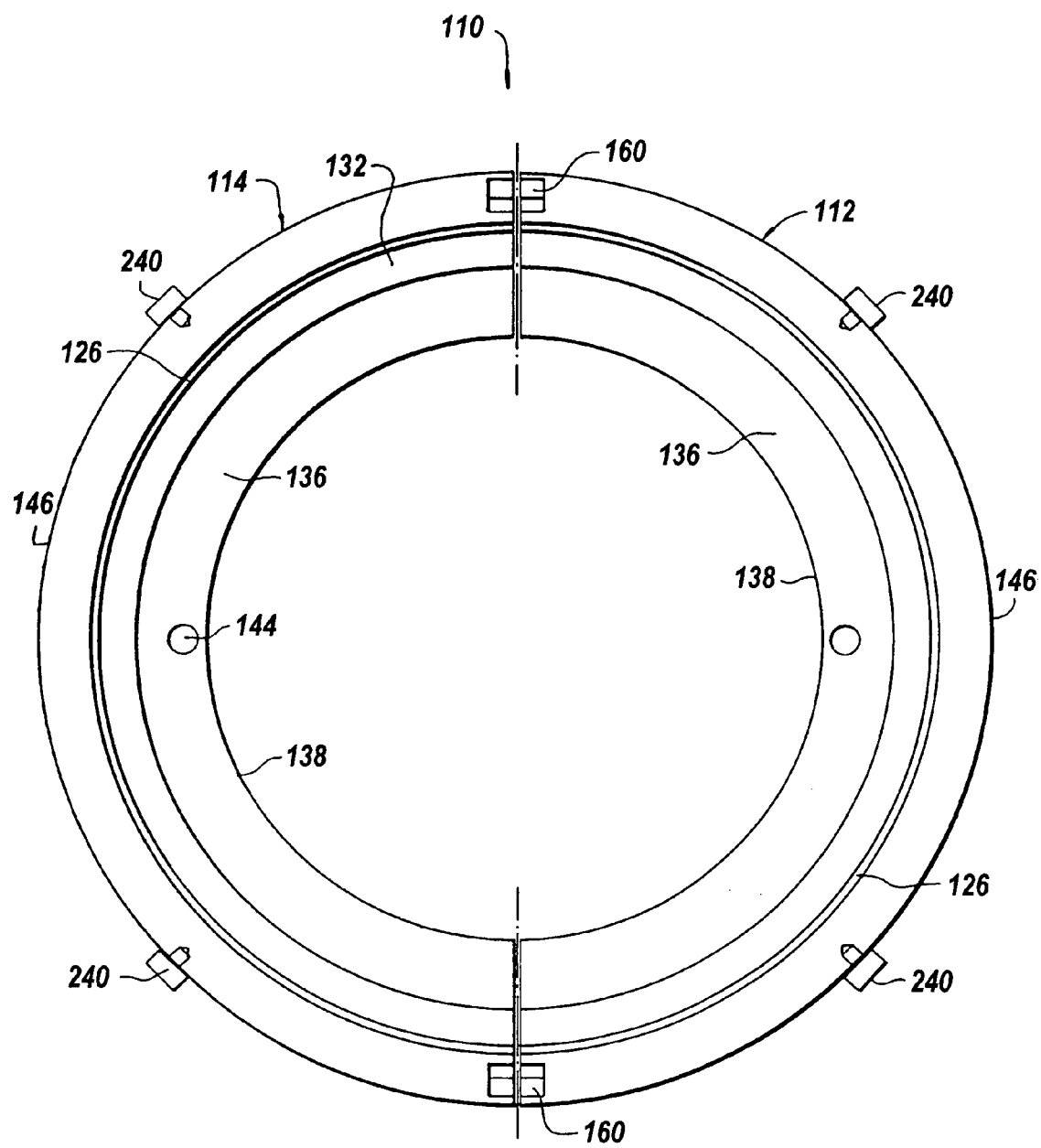
FIG. 18 is a plan view of a holder assembly according to a preferred embodiment of the invention.

Prior to fully securing the gland screws 90 to the housing 14, the shaft 12, the holder assembly 110, and the rotary and stationary seal rings 20, 30 should be centered within the chamber 24. As described above, the detent groove 189 facilitates centering of the rotary seal ring 20. In addition, centering spacers 240, may be optionally be provided along the outer surface 116 of the holder assembly 110, as shown in FIG. 18 to center the gland segments 41, 42 by way of centering spacers 240 formed. The spacers can be integrally formed on the holder outer surface 116, or can be mounted in depressions formed along the holder outer surface 116. In a preferred embodiment, the spacers 240 are circumferentially and evenly spaced about the first outer surface 146 of the holder assembly 110. The spacers 240 are preferably formed of a soft wearable material, such as Teflon, which prevents scoring of the gland inner surface during rotational movement of the holder assembly 110. Although the FIG. 18 embodiment shows four evenly separated spacers, any number and spacing of spacers can be employed. Additionally, the spacers 240 need not be formed on the holder first outer surface 146, but can be formed at various holder locations.

Other suitable centering mechanism may also be used.

When the gland assembly 40 and the holder assembly 110 are properly aligned, the gland gasket 76 and the holder gasket 160 are captured in separate gasket grooves formed on opposite sealing faces of the gland and holder segments. This double-capture configuration allows the mechanical seal 10 to withstand higher pressures without degradation of the pressure and fluid seals formed at the segment sealing faces. Additionally, the O-ring 202 forms a pressure-tight and fluid-tight seal between the gland inner surface, e.g. gland second face 50 and first wall 48, and the outer surface 36 of the stationary seal ring 30.

After the mechanical seal is assembled and mounted to the pump housing 14, the pump process medium, e.g. hydraulic fluid, is sealed within a process medium channel 234, as shown in FIG. 3, defined by the gland inner surface 54 (excluding the gland first face 46), O-ring 202, the holder assembly outer surface 116, the stationary seal ring outer surface 190 and abutment 192, the rotary seal ring first and second surfaces 180,182, the holder assembly inner surface 124, and O-ring 188. The ambient environment medium, typically air, fills an ambient process channel 236, typically sealed from the process channel 234, that is defined by the stationary and rotary seal ring inner surfaces 35, 172, the stationary ring outer surface 190, the gland first and second faces 46, 50 and first wall 48, the rotary seal ring third outer surface 184, and the holder assembly first wall 132. The phrase "ambient environment" is intended to include any external environment other than the internal environment of the housing 14.

The stationary and rotary seal ring segment sealing faces 22, 32 are placed in sealing contact with the other segment of the pair by the radial force of the O-rings 188 and 202. In addition, the hydraulic pressure of the process medium contained within the process channel 234 exerts an additional radially inward force, proportional to the fluid pressure, upon the seal ring segment outer surfaces 36,190, biasing the segment sealing faces 32 together.

Overall, the O-ring 142 prevents the seepage of process medium along the shaft 12 and into the ambient process channel 236. The flat gasket 60 prevents the seepage of process medium along the housing 14 and mechanical seal 10 interface and the O-rings 188 and 202 prevent process medium from invading the ambient process channel 236 by way of the holder assembly 110 and the gland 40, respectively.

The illustrative mechanical seal assembly of the illustrative embodiments of the invention provide significant advantages over the prior art, including ease of installation of the mechanical seal assembly and functional improvements. For example, the use of the detent groove and/or the double-angled lead-in on the holder assembly inner surface enables improved rotary face insertion, with less insertion force required. The insertion force may be reduced by between about 59% and 70%, though the invention is not limited to this range. By lowering the insertion force, the installer is less likely to damage the seal faces upon installation, thereby prolonging the lifetime of the seal components and improving overall operation. The illustrative configuration may also eliminate the need to hold the rotary seal face in position during installation, because the detent groove automatically positions the rotary seal face in a proper position. During operation, the detent groove provides improved squaring of the rotary seal face relative to the shaft, and prevents the rotary seal ring and/or associated O-ring from moving and/or popping out of position, which can be difficult to fix. The double-angled lead-in also allows the holder to be first tightened to the shaft before insertion of the rotary seal ring and O-ring, which results in improved squaring of the rotary seal face relative to the shaft.

In addition, the overlapping gland segments prevent sliding of the gland segments relative to each other when force is applied to the assembly, thereby improving performance and extending the lifetime of the seal components.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A gland assembly of a split mechanical seal assembly for providing a seal around a shaft, the shaft extending along a longitudinal axis from stationary equipment, the gland assembly extending in an axial direction that is generally parallel to the longitudinal axis of the shaft and extending in a radial direction that is generally perpendicular to the axis of the shaft and comprising:
    a first arcuate gland segment having an intermediate circumference, a first portion of the first arcuate gland segment terminating at the intermediate circumference, the first arcuate gland segment comprising:
    a first screw housing formed at a first end and extending outward in the radial direction from the intermediate circumference of the first arcuate gland segment to an outer circumference so that the first arcuate gland segment has a non-uniform circumference that is wider at the outer circumference than at the intermediate circumference, the first screw housing comprising:
        a first interfacing surface extending in the axial direction and in the radial direction, and a projection extending from the first interfacing surface, the projection having a first side contacting the first interfacing surface, a second side contacting the first interfacing surface, and a stepped surface disposed between the first side and the second side in the radial direction, the stepped surface having a first flat, axially-extending face, a second flat, axially-extending face, and a first radially-extending face connecting the first and second flat, axially-extending faces, the faces of the stepped surface being disposed in the following respective order beginning from a first end of the gland assembly in the axial direction and ending at an opposing end of the gland assembly in the axial direction: the first axially-extending face, the first radially-extending face, and the second axially-extending face, and
        a U-shaped groove extending through a depth of the first screw housing in the axial direction, the groove having a length extending in the radial direction from the outer circumference towards the intermediate circumference, the groove sized and configured to receive a fastener extending in the axial direction to thereby exert a bolting force in the axial direction; and
    the first arcuate gland segment further comprising a second interfacing surface formed at a second end; and
    a second arcuate gland segment, the second arcuate gland segment comprising:
        a third interfacing surface formed at a first end which is a stepped surface configured to couple to the first interfacing surface, and
        a fourth interfacing surface at a second end configured to couple to the second interfacing surface to form an annular gland assembly, a second screw housing at the second end of the fourth interfacing surface, a U shaped groove extending through a depth of the second screw housing in the axial direction,
    wherein at least the first and third interfacing surfaces are shaped complimentary to each other so that the first and second flat, axially extending faces and the first radially-extending face contact the third interfacing surface to interlock and transmit the bolting force exerted in the axial direction on one of the arcuate gland segments to the other coupled gland segment through the first radially-extending face.

2. The gland assembly of claim 1, wherein the first interfacing surface includes a protrusion and the third interfacing surface includes a recess sized and configured to receive the protrusion to secure the first arcuate gland segment to the second arcuate gland segment.

3. The gland assembly of claim 1, wherein the axially-extending faces are parallel to each other, and the radially-extending face extends perpendicular to the axially-extending faces.

4. The gland assembly of claim 1, wherein the second interfacing surface is a stepped surface having a third flat, axially-extending face, a fourth flat, axially-extending face and a second-radially extending face connecting the third and fourth flat, axially-extending faces.

5. The gland assembly of claim 3, wherein the first and second radially-extending faces abut each other when the gland assembly is assembled to form an overlap.

6. The gland assembly of claim 2, wherein the first interfacing surface further includes a recess and the third interfacing surface includes a protrusion sized and dimensioned to be received by the recess.

7. The gland assembly of claim 2, wherein the second interfacing surface includes a protrusion and the fourth interfacing surface includes a recess sized and configured to receive the protrusion to secure the second end of the first arcuate gland segment to the second end of the second arcuate gland segment.

8. The gland assembly of claim 7, wherein the second interfacing surface further includes a recess and the fourth interfacing surface includes a protrusion sized and dimensioned to be received by the recess in the second interfacing surface.

* * * * *